(12) United States Patent
Dai et al.

(10) Patent No.: US 11,237,366 B2
(45) Date of Patent: Feb. 1, 2022

(54) OPTICAL IMAGING LENS

(71) Applicant: Zhejiang Sunny Optical Co., Ltd, Ningbo (CN)

(72) Inventors: Fujian Dai, Ningbo (CN); Lin Huang, Ningbo (CN); Yunbing Ji, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 140 days.

(21) Appl. No.: 16/689,201

(22) Filed: Nov. 20, 2019

(65) Prior Publication Data

US 2021/0055515 A1   Feb. 25, 2021

(30) Foreign Application Priority Data

Aug. 19, 2019   (CN) .......................... 201910764560.7

(51) Int. Cl.
| | | |
|---|---|---|
| *G02B 13/00* | (2006.01) | |
| *G02B 9/62* | (2006.01) | |
| *G02B 13/18* | (2006.01) | |
| *G02B 3/04* | (2006.01) | |
| *G02B 27/00* | (2006.01) | |
| *G02B 9/64* | (2006.01) | |
| *G02B 13/04* | (2006.01) | |

(Continued)

(52) U.S. Cl.
CPC ............ *G02B 13/0045* (2013.01); *G02B 9/62* (2013.01); *G02B 13/18* (2013.01); *G02B 3/04* (2013.01); *G02B 5/005* (2013.01); *G02B 9/64* (2013.01); *G02B 13/04* (2013.01); *G02B 13/16* (2013.01); *G02B 27/0025* (2013.01)

(58) Field of Classification Search
None
See application file for complete search history.

(56) References Cited

U.S. PATENT DOCUMENTS 10,678,025 B2 *   6/2020   Chen ........................ G02B 9/64
10,976,523 B2 *   4/2021   Song ...................... G02B 13/00
(Continued)

*Primary Examiner* — Evelyn A Lester
(74) *Attorney, Agent, or Firm* — Sughrue Mion, PLLC

(57) ABSTRACT

The application discloses an optical imaging lens, and the optical imaging lens sequentially comprises the following components from an object side to an image side along an optical axis: a first lens, a second lens, a third lens, a fourth lens, a fifth lens, a sixth lens and a seventh lens, wherein the first lens has a refractive power; the second lens has a refractive power; the third lens has a refractive power, the object side surface of the third lens is a convex surface, and the image side surface of the third lens is a convex surface; the fourth lens has a refractive power, the object side surface of the fourth lens is a convex surface, and the image side surface of the fourth lens is a concave surface; the fifth lens has a refractive power; the sixth lens has a positive refractive power; and the seventh lens has a refractive power, and the object side surface of the seventh lens is a convex surface. Wherein, the total effective focal length f of the optical imaging lens and the entrance pupil diameter EPD of the optical imaging lens satisfy the following relation: f/EPD<1.7; and the total effective focal length f of the optical imaging lens and the maximum semi field of view Semi-FOV of the optical imaging lens meet the following relation: 4 mm<tan(Semi-FOV)×f<5 mm.

9 Claims, 13 Drawing Sheets

(51) Int. Cl.
  *G02B 5/00* (2006.01)
  *G02B 13/16* (2006.01)

(56) References Cited

U.S. PATENT DOCUMENTS

| | | | |
|---|---|---|---|
| 2015/0247993 A1* | 9/2015 | Ishizaka | G02B 13/0045 359/708 |
| 2016/0033742 A1* | 2/2016 | Huang | G02B 9/64 359/708 |
| 2016/0033743 A1* | 2/2016 | Chen | G02B 27/0025 359/708 |
| 2018/0188493 A1* | 7/2018 | Huang | G02B 9/64 |
| 2018/0239115 A1* | 8/2018 | Hsu | G02B 9/64 |
| 2019/0094494 A1* | 3/2019 | Hsu | G02B 27/0025 |
| 2019/0377161 A1* | 12/2019 | Lin | G02B 13/0045 |
| 2020/0257084 A1* | 8/2020 | Dai | G02B 13/0045 |
| 2020/0355891 A1* | 11/2020 | Ye | G02B 13/04 |
| 2020/0400921 A1* | 12/2020 | Huang | G02B 9/64 |
| 2020/0400922 A1* | 12/2020 | Hirano | H04N 5/2254 |
| 2020/0409091 A1* | 12/2020 | Sun | G02B 9/62 |
| 2020/0409092 A1* | 12/2020 | Sun | G02B 13/0045 |
| 2020/0409106 A1* | 12/2020 | Lin | G02B 13/18 |
| 2021/0003829 A1* | 1/2021 | Dai | G02B 13/0045 |
| 2021/0033826 A1* | 2/2021 | Huang | G02B 9/64 |
| 2021/0041670 A1* | 2/2021 | Yang | G02B 13/0045 |
| 2021/0055514 A1* | 2/2021 | Dai | G02B 13/0045 |
| 2021/0132340 A1* | 5/2021 | Wang | G02B 27/0025 |
| 2021/0157105 A1* | 5/2021 | Chen | G02B 5/005 |

* cited by examiner

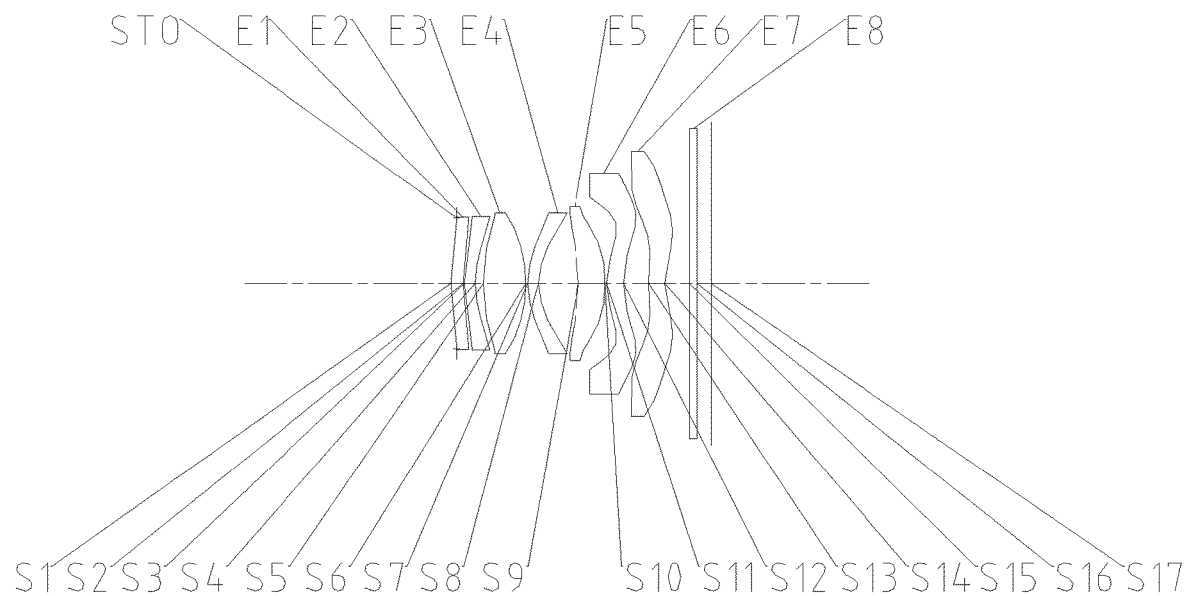
Fig. 1
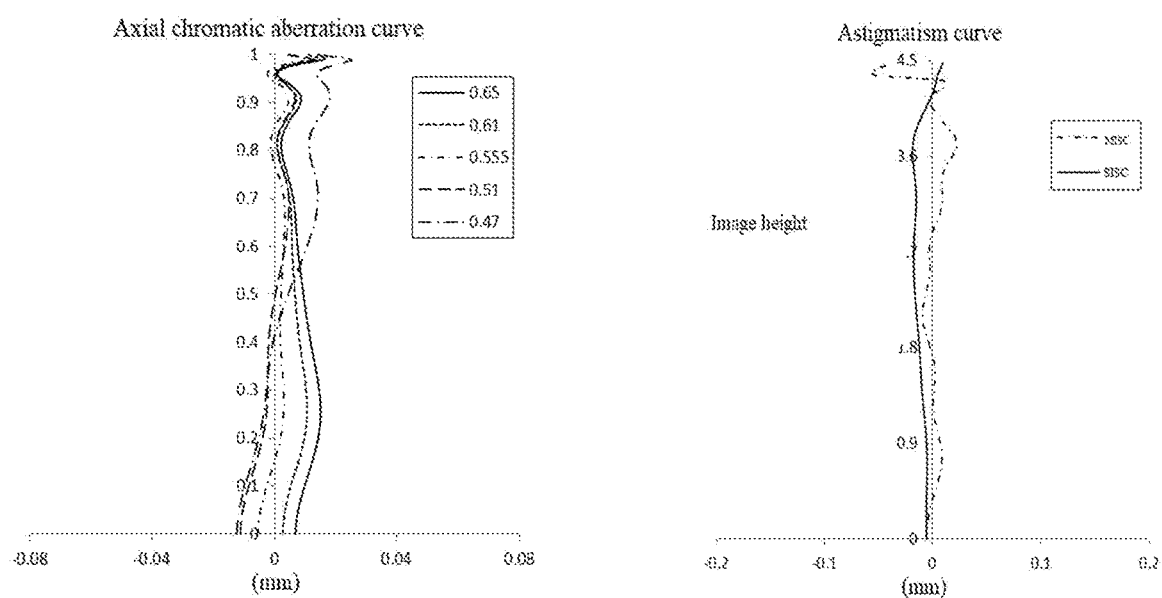
Fig. 2A
Fig. 2B

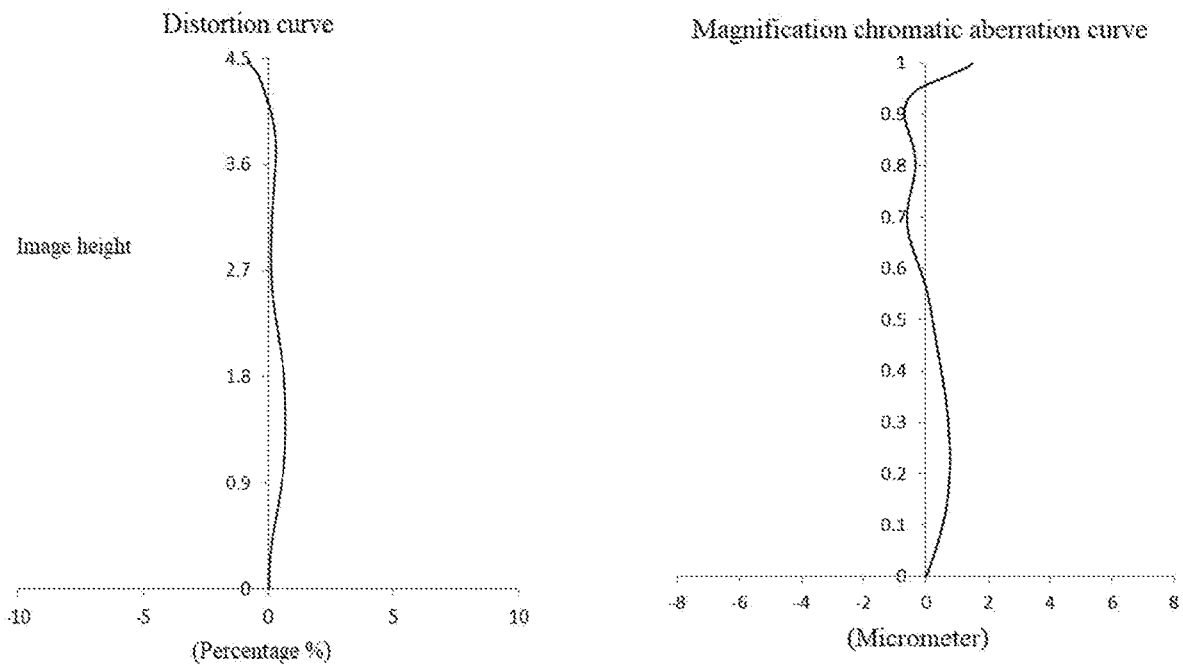
Fig. 2C
Fig. 2D
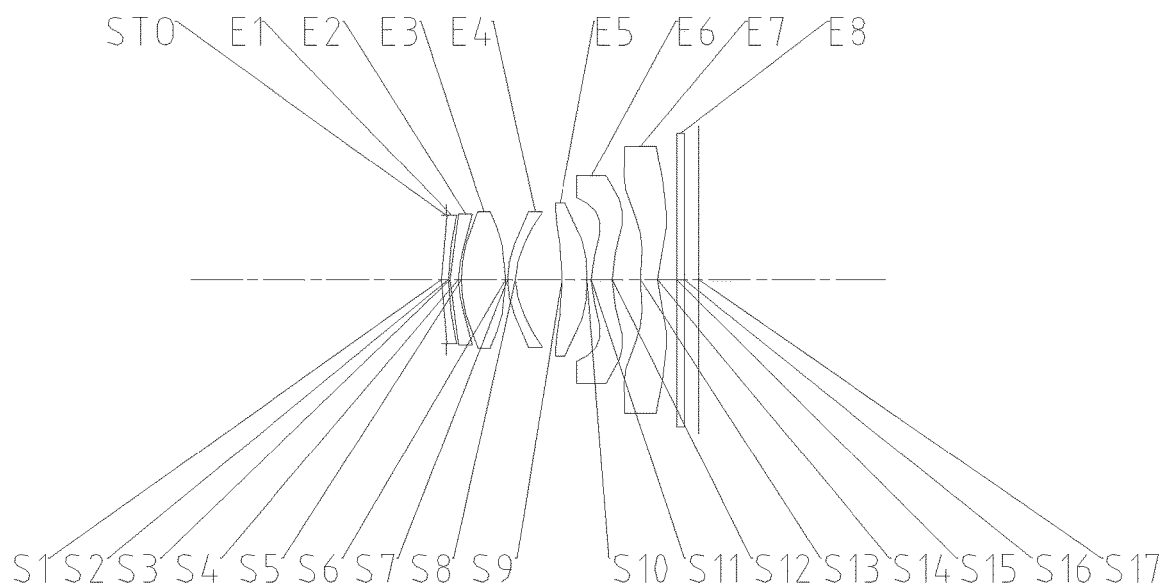
Fig. 3

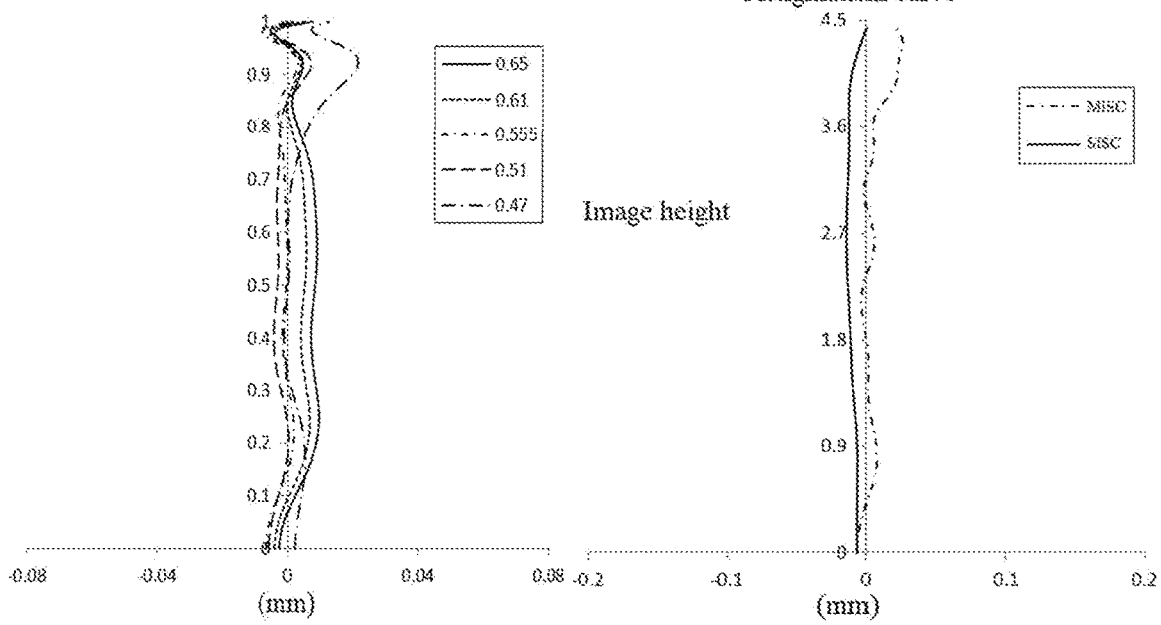
Fig. 12A
Fig. 12B
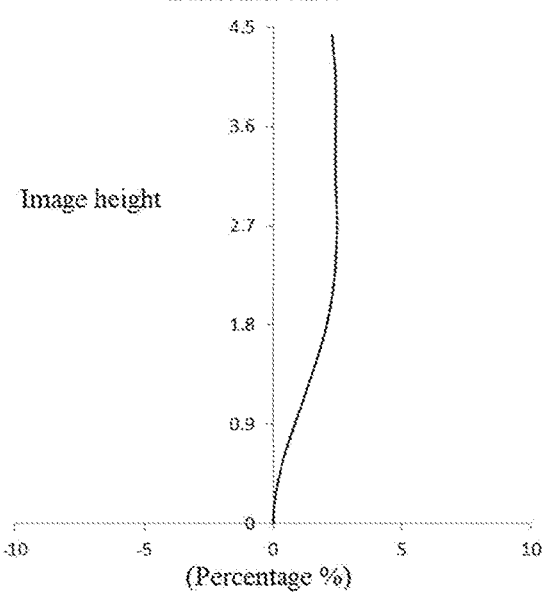
Fig. 12C
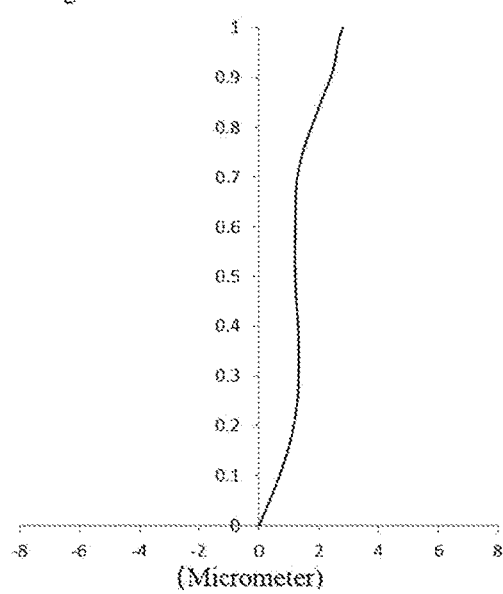
Fig. 12D

OPTICAL IMAGING LENS

TECHNICAL FIELD

The application relates to an optical imaging lens, and more particularly to an optical imaging lens including seven lenses.

BACKGROUND

With the rapid development of electronic products, the application of imaging lenses has become more and more widespread. On the one hand, as portable electronic products are gradually becoming lighter and thinner, the imaging lens thereof is required to have not only good image quality but also light and thin characteristics to effectively reduce the thickness of the portable electronic products. On the other hand, there is an increasing demand for the imaging quality of the imaging lenses for portable electronic products. With the popularization of the application of the portable electronic products, the application scenarios thereof are more diversified. For the imaging lens used in a matched way, the requirements of high pixel, high resolution, miniaturization and brightness are also put forward.

SUMMARY

On the one hand, the application provides an optical imaging lens, and the optical imaging lens sequentially comprises the following components from the object side to the image side along the optical axis: a first lens, a second lens, a third lens, a fourth lens, a fifth lens, a sixth lens and a seventh lens, wherein the first lens has a refractive power; the second lens has a refractive power; the third lens has a refractive power, the object side surface of the third lens is a convex surface, and the image side surface of the third lens is a convex surface; the fourth lens has a refractive power, the object side surface of the fourth lens is a convex surface, and the image side surface of the fourth lens is a concave surface; the fifth lens has a refractive power; the sixth lens has a positive refractive power; and the seventh lens has a refractive power, and the object side surface of the seventh lens is a convex surface.

In an embodiment, the total effective focal length f of the optical imaging lens and the entrance pupil diameter EPD of the optical imaging lens satisfy the following relation: f/EPD<2. Optionally, f/EPD<1.7.

In an embodiment, the total effective focal length f of the optical imaging lens and the maximum semi field of view Semi-FOV of the optical imaging lens satisfy the following relation: 4 mm<tan(Semi-FOV)×f<5 mm.

In an embodiment, the object side surface of the first lens is a convex surface.

In an embodiment, the distance SAG41 on the optical axis from the intersection of the object side surface of the fourth lens and the optical axis to the effective radius vertex of the object side surface of the fourth lens and the distance SAG42 on the optical axis from the intersection of the image side surface of the fourth lens and the optical axis to the effective radius vertex of the image side surface of the fourth lens satisfy the following relation: 0.5<SAG41/SAG42<1.

In an embodiment, the combined focal length f123 of the first lens, the second lens and the third lens and the total effective focal length f of the optical imaging lens satisfy following relation: 0.6<f123/f≤1.18.

In an embodiment, the total effective focal length f of the optical imaging lens and the effective focal length f6 of the sixth lens satisfy the following relation: 0.52≤f/f6<1.1.

In an embodiment, the spacing distance T45 between the fourth lens and the fifth lens on the optical axis and the spacing distance T67 between the sixth lens and the seventh lens on the optical axis satisfy the following relation: 0.3<T67/T45<1.

In an embodiment, the center thickness CT3 of the third lens on the optical axis, the center thickness CT5 of the fifth lens on the optical axis, the center thickness CT6 of the sixth lens on the optical axis and the distance TTL from the object side surface of the first lens to the imaging plane of the optical imaging lens on the optical axis satisfy the following relation: 0.1<(CT3+CT5+CT6)/TTL<0.6.

In an embodiment, the spacing distance T12 between the first lens and the second lens on the optical axis, the spacing distance T23 between the second lens and the third lens on the optical axis, the spacing distance T34 between the third lens and the fourth lens on the optical axis and the center thickness CT3 of the third lens on the optical axis satisfy the following relation: 0<(T12+T23+T34)/CT3≤0.33.

In an embodiment, the curvature radius R5 of the object side surface of the third lens, the curvature radius R6 of the image side surface of the third lens and the effective focal length f3 of the third lens satisfy the following relation: 0<f3/(R5−R6)≤0.48.

In an embodiment, the curvature radius R7 of the object side surface of the fourth lens and the curvature radius R8 of the image side surface of the fourth lens satisfy the following relation: 0<(R7−R8)/(R7+R8)<0.3.

In an embodiment, the maximum effective radius DT11 of the object side surface of the first lens and the maximum effective radius DT31 of the object side surface of the third lens may satisfy the following relation: DT11/DT31≤0.96.

In an embodiment, the curvature radius R13 of the object side surface of the seventh lens and the curvature radius R14 of the image side surface of the seventh lens satisfy the following relation: 0.2<|R14/R13|<0.6.

According to the application, the seven lenses are adopted, and the refractive power, the surface type, the center thickness of each lens, the axial distance between the lenses and the like are reasonably distributed, so that the optical imaging lens has at least one beneficial effect of large aperture, miniaturization, high imaging quality and the like.

BRIEF DESCRIPTION OF THE DRAWINGS

Other features, objects and advantages of the application will become more apparent from the detailed description of non-limiting embodiments with reference to the following drawings:

FIG. 1 is a structural schematic diagram of an optical imaging lens according to embodiment 1 of the application;

FIG. 2A to FIG. 2D respectively show an axial chromatic aberration curve, an astigmatism curve, a distortion curve and a magnification chromatic aberration curve of an optical imaging lens of embodiment 1;

FIG. 3 is a structural schematic diagram of an optical imaging lens according to embodiment 2 of the application;

FIG. 12A to FIG. 12D show an axial chromatic aberration curve, an astigmatism curve, a distortion curve and a magnification chromatic aberration curve of an optical imaging lens of embodiment 6, respectively.

DETAILED DESCRIPTION OF THE EMBODIMENTS

Figure 4A:
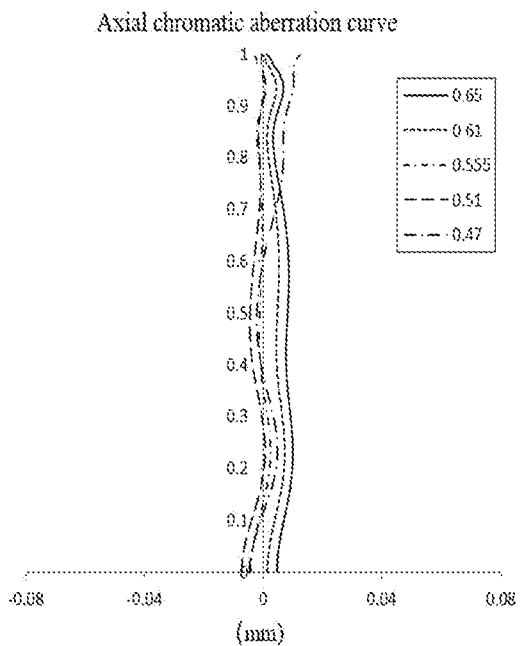
FIG. 4A to FIG. 4D show an axial chromatic aberration curve, an astigmatism curve, a distortion curve and a magnification chromatic aberration curve of an optical imaging lens of embodiment 2, respectively.

To better understand of the present application, various aspects of the application will be described in more detail with reference to the drawings. It should be understood that the detailed description is only illustrative of the exemplary embodiments of the application and is not intended to limit the scope of the application in any way. Throughout the specification, the same drawing reference numerals refer to the same s. The expression "and/or" includes any and all combinations of one or more of the associated listed items.

It should be noted that in the specification, the expressions "first", "second", "third" and the like are used only to distinguish one feature from another and do not indicate any limitation to the features. Thus, a first lens discussed below may also be referred to as a second lens or a third lens without departing from the contexts of the application.

In the drawings, the thickness, the size and the shape of the lens have been slightly exaggerated for illustrative purposes. Specifically, the shapes of the spherical surfaces or aspherical surfaces shown in the drawings are shown by way of example. That is to say, the shape of the spherical surface or the aspherical surface is not limited to the shape of the spherical surface or the aspherical surface shown in the drawings. The drawings are exemplary only and are not drawn necessarily in proportion.

In this context, a paraxial region refers to a region near the optical axis. If the lens surface is a convex surface and the position of the convex surface is not defined, it means that the lens surface is a convex surface at least in the paraxial region; and if the lens surface is concave surface and the position of the concave surface is not defined, it means that the lens surface is a concave surface at least in the paraxial region. The surface of each lens closest to a subject is referred to as the object side surface of the lens, and the surface of each lens closest to the surface of the imaging plane is referred to as the image side surface of the lens.

It will be further understood that the terms "comprise", "comprising", "has", "containing" and/or "including" used in the specification specify the presence of the stated features, s, and/or components, but do not preclude the presence or addition of one or more other features, s, components, and/or combination thereof. Furthermore, when an expression, such as "at least one of the . . . " appears after a list of listed features, the entire listed features are modified rather than individual s of the list. Moreover, when embodiments of the application are described, "may" is used to mean "one or more embodiments of the application". In addition, the term "exemplary" is intended to refer to an example or illustrate.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of relevant art and will not be interpreted in an idealized or overly formal sense unless explicitly defined herein.

It should be noted that the embodiments and the features in the embodiments in the application can be combined with each other without conflict. The application will now be described in detail with reference to the drawings in combination with the embodiments.

The features, principles, and other aspects of the application are described in detail as folllows.

The optical imaging lens according to the exemplary embodiments of the application may comprise, for example, seven lenses having optical powers, and the seven lenses are a first lens, a second lens, a third lens, a fourth lens, a fifth lens, a sixth lens, and a seventh lens, respectively. The seven lenses are arranged sequentially from an object side to an image side along an optical axis. Any two adjacent lenses from the first lens to the seventh lens can have a spacing distance.

In an exemplary embodiment, a first lens has a refractive power; a second lens has a refractive power; a third lens has a refractive power, the object side surface of the third lens can be a convex surface, and the image side surface of the third lens can be a convex surface; a fourth lens has a refractive power, the object side surface of the fourth lens can be a convex surface, and the image side surface of the fourth lens can be a concave surface; a fifth lens has a refractive power; a sixth lens may have a positive refractive power; and a seventh lens has a refractive power, and the object side surface of the seventh lens may be a convex surface.

In an exemplary embodiment, the object side surface of a first lens may be a convex surface.

In an exemplary embodiment, an optical imaging lens according to the application may satisfy the following relation: f/EPD<2, wherein f is the total effective focal length of the optical imaging lens, and EPD is the entrance pupil diameter of the optical imaging lens. More specifically, f and EPD may further satisfy the following relation: f/EPD<1.7. Optionally, f/EPD<1.5. The optical imaging lens meets the requirement that f/EPD<2, and the optical imaging lens further meets the requirement that f/EPD<1.7, the optical imaging lens has the advantage of large aperture in the process of increasing light flux, so that the aberration of the edge field of view is reduced, and the imaging effect in a dark environment is enhanced.

In an exemplary embodiment, an optical imaging lens according to the application may satisfy the following relation: 4 mm<tan(Semi-FOV)×f<5 mm, wherein f is the total effective focal length of the optical imaging lens, and Semi-FOV is the maximum semi field of view of the optical imaging lens. More specifically, f and Semi-FOV may further satisfy the following relation: 4.2 mm<tan(Semi-FOV)×f<4.7 mm. The optical imaging lens meets the requirement that 4 mm<tan(Semi-FOV)×f<5 mm, can effectively control the imaging range of the optical imaging lens on an imaging surface, is beneficial to matching the size of a chip and is also beneficial to reducing the aberration of a system.

In an exemplary embodiment, an optical imaging lens according to the application may satisfy the following relation: 0.5<SAG41/SAG42<1, wherein SAG41 is the distance on the optical axis from the intersection of the object side surface of the fourth lens and the optical axis to the effective radius vertex of the object side surface of the fourth lens, and SAG42 is the distance on the optical axis from the intersection of the image side surface of the fourth lens and the optical axis to the effective radius vertex of the image side surface of the fourth lens. More specifically, SAG41 and SAG42 may further satisfy the following relation: 0.7<SAG41/SAG42<0.9. The optical imaging lens meets the requirement that 0.5<SAG41/SAG42<1, the over-bending of the fourth lens can be effectively avoided, the molding and processing difficulty of the lens is reduced, and the optical imaging lens assembling has higher stability.

In an exemplary embodiment, an optical imaging lens according to the application may satisfy the following relation: 0.6<f123/f≤1.18, wherein f123 is the combined focal length of the first lens, the second lens and the third lens, and f is the total effective focal length of the optical imaging lens. More specifically, f123 and f may further satisfy the following relation: 0.8<f123/f≤1.18. The optical imaging lens meets the requirement that 0.6<f123/f≤1.18, the refractive power of the first lens, the second lens and the third lens can be reasonably distributed, the optical imaging lens is beneficial to better balancing aberration, and is also beneficial to improving the resolving power of the optical imaging lens.

In an exemplary embodiment, an optical imaging lens according to the application may satisfy the following relation: 0.52≤f/f6<1.1, wherein f is the total effective focal length of the optical imaging lens, and f6 is the effective focal length of the sixth lens. More specifically, f and f6 may further satisfy the following relation: 0.52≤f/f6<0.90. The optical imaging lens meets the requirement that 0.52≤f/f6<1.1, the refractive power of the sixth lens can be reasonably distributed, so that the optical imaging lens is beneficial to better balancing aberration, and is also beneficial to improving the resolving power of the optical imaging lens.

In an exemplary embodiment, an optical imaging lens according to the application may satisfy the following relation: 0.3<T67/T45<1, wherein T45 is the spacing distance between the fourth lens and the fifth lens on the optical axis, and T67 is the spacing distance between the sixth lens and the seventh lens on the optical axis. More specifically, T45 and T67 may further satisfy the following relation: 0.4<T67/T45<0.9. The optical imaging lens meets the requirement that 0.3<T67/T45<1, the spacing distance between the optical imaging lenses can be reasonably distributed, the processing and assembling characteristics are guaranteed, the problems of front and back lens interference and the like caused by too small spacing distance between the optical imaging lenses in the assembling process are avoided, light deflection can be favorably slowed down, the field curvature of the optical imaging lenses is adjusted, the sensitivity is reduced, and better imaging quality is further obtained.

In an exemplary embodiment, an optical imaging lens according to the application may satisfy the following relation: 0.1<(CT3+CT5+CT6)/TTL<0.6, wherein CT3 is the center thickness of the third lens on the optical axis, CT5 is the central thickness of the fifth lens on the optical axis, CT 6 is the center thickness of the sixth lens on the optical axis, and TTL is the distance from the object side surface of the first lens to the imaging plane of the optical imaging lens on the optical axis. CT3, CT5, CT6 and TTL can further satisfy the following relation: 0.2<(CT3+CT5+CT6)/TTL<0.5. The optical imaging lens meets the requirement that 0.1<(CT3+CT5+CT6)/TTL<0.6, the thickness of the second lens, the thickness of the third lens and the thickness of the sixth lens can be reasonably distributed, so that the optical imaging lens is beneficial to obtaining better imaging quality, and the assembling stability and the miniaturization of the optical imaging lens are facilitated.

In an exemplary embodiment, an optical imaging lens according to the application may satisfy the following relation: 0<(T12+T23+T34)/CT3≤0.33, where T12 is the spacing distance between the first lens and the second lens on the optical axis, T23 is the spacing distance between the second lens and the third lens on the optical axis, T34 is the spacing distance between the third lens and the fourth lens on the optical axis, and CT3 is the center thickness of the third lens on the optical axis. More specifically, T12, T23, T34 and CT3 may further satisfy the following relation: 0.1<(T12+T23+T34)/CT3≤0.33. The optical imaging lens meets the requirement that 0<(T12+T23+T34)/CT3≤0.33, the spacing distance and the center thickness among the lenses in the optical axis direction can be reasonably distributed, the aberration is effectively controlled, the optical imaging lens can obtain better imaging quality, and the assembling stability and the miniaturization of the optical imaging lens are ensured.

In an exemplary embodiment, an optical imaging lens according to the application may satisfy the following relation: 0<f3/(R5−R6)≤0.48, wherein R5 is the curvature radius of the object side surface of the third lens, R6 is the curvature radius of the image side surface of the third lens, and f3 is the effective focal length of the third lens. More specifically, f3, R5 and R6 may further satisfy the following relation: 0.2<f3/(R5−R6)≤0.48. The optical imaging lens meets the requirement that 0<f3/(R5−R6)≤0.48, the range of the curvature radius of the third lens can be reasonably configured to prevent the incident light from being excessively bent, and the astigmatism of the optical imaging lens can be effectively controlled.

In an exemplary embodiment, an optical imaging lens according to the application may satisfy the following relation: 0<(R7−R8)/(R7+R8)<0.3, wherein R7 is the curvature radius of the object side surface of the fourth lens, and R8 is the curvature radius of the image side surface of the fourth lens. More specifically, R7 and R8 may further satisfy the following relation: 0<(R7−R8)/(R7+R8)<0.2. The optical imaging lens meets the requirement that 0<(R7−R8)/(R7+R8)<0.3, the range of the curvature radius of the fourth lens can be reasonably configured to prevent the incident light from being excessively bent, the aberration of the optical imaging lens is effectively controlled, and therefore higher resolving power is obtained.

In an exemplary embodiment, an optical imaging lens according to the application may satisfy the following relation: DT11/DT31≤0.96, where DT11 is the maximum effective radius of the object side of the first lens, and DT31 is the maximum effective radius of the object side of the third lens. More specifically, DT11 and DT31 may further satisfy the following relation: 0.9<DT11/DT31≤0.96. The optical imaging lens meets the requirement that DT11/DT31≤0.96, the maximum effective radius of the first lens and the maximum effective radius of the third lens can be reasonably controlled, the situation that the caliber section difference between the lenses is too large can be effectively prevented, and the assembling stability of the optical imaging lens can be guaranteed.

In an exemplary embodiment, an optical imaging lens according to the application may satisfy the following relation: 0.2<|R14/R13|<0.6, wherein R13 is the curvature radius of the object side surface of the seventh lens, and R14 is the curvature radius of the image side surface of the seventh lens. The optical imaging lens meets the requirement that 0.2<|R14/R13|<0.6, the range of the curvature radius of the seventh lens can be reasonably configured to prevent the incident light from being excessively bent, the aberration of the optical imaging lens is effectively controlled, and higher resolution is further obtained.

In an exemplary embodiment, the optical imaging lens according to the application further comprises a diaphragm disposed between the object side and the first lens. Optionally, the optical imaging lens may further comprise a filter for correcting color deviation and/or a protective glass for protecting a photosensitive located on the imaging plane.

The optical imaging lens according to the above embodiments of the application may adopt a plurality of lenses, for example, seven lenses as described above. By reasonably distributing the refractive power, the surface type, the center thickness of each lens, the axial distance between each lens and the like of each lens, the incident light can be effectively converged, the total optical length of the imaging lens is reduced, the processability of the imaging lens is improved, and the optical imaging lens is more beneficial to production and processing. The optical imaging lens configured by the above method also has features such as a large aperture, a wide field of view, and excellent imaging quality.

In the embodiments of the application, at least one of the mirror surfaces of each lens is an aspherical mirror surface, that is to say, at least one of the mirror surfaces of the object side surface of the first lens to the image side surface of the seventh lens is an aspherical mirror surface. An aspheric lens is characterized in that the curvature varies continuously from the center of the lens to the periphery of the lens. Unlike a spherical lens having a constant curvature from the center to the periphery of the lens, the aspherical lens has a better curvature radius characteristic, and has advantages of improving distortion aberration and improving astigmatic aberration. By using the aspherical lens, the aberration occurring at the time of imaging can be eliminated as much as possible, thereby improving the imaging quality. Optionally, at least one of the object side surface and the image side surface of each of the first lens, the second lens, the third lens, the fourth lens, the fifth lens, the sixth lens, and the seventh lens is an aspherical mirror surface. Optionally, the object side surface and the image side surface of each of the first lens, the second lens, the third lens, the fourth lens, the fifth lens, the sixth lens and the seventh lens are aspheric mirror surfaces.

However, it will be appreciated by those skilled in the art that the number of lenses comprising the optical imaging lens may be varied to achieve the various results and advantages described in the specification without departing from the technical scheme disclosed by the application. For example, although seven lenses are exemplified in the embodiment, the optical imaging lens is not limited to including seven lenses. The optical imaging lens may also comprise other number of lenses, if desired.

Specific embodiments of the optical imaging lens applicable to the above-described embodiments are further described below with reference to the drawings.

Embodiment 1

An optical imaging lens according to embodiment 1 of the application is described below with reference to FIG. 1 to FIG. 2D. FIG. 1 shows a structural schematic diagram of the optical imaging lens according to embodiment 1 of the application.

As shown in FIG. 1, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens is a convex surface and the image side surface S2 of the first lens is a concave surface. The second lens E2 has a negative refractive power, and the object side surface S3 of the second lens is a convex surface and the image side surface S4 of the second lens is a concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from an object passes through each of the surfaces S1 to S16 in order and is finally imaged on the imaging plane S17.

Table 1 shows a basic parameter table of the optical imaging lens of embodiment 1, in which the units of the curvature radius, the thickness/distance, and the focal length are millimeters (mm).

TABLE 1

| Surface number | Surface type | Curvature Radius | Thickness/distance | Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.1512 | | | | |
| S1 | Aspheric surface | 5.5000 | 0.3429 | 1.55 | 56.11 | 35.15 | 1.3304 |
| S2 | Aspheric surface | 7.5402 | 0.0300 | | | | −18.9137 |
| S3 | Aspheric surface | 3.3149 | 0.3000 | 1.68 | 19.25 | −19.03 | −4.8281 |
| S4 | Aspheric surface | 2.5406 | 0.2265 | | | | −1.7626 |
| S5 | Aspheric surface | 5.4805 | 1.1785 | 1.55 | 56.11 | 4.13 | 0.0000 |
| S6 | Aspheric surface | −3.5419 | 0.0500 | | | | 0.5169 |
| S7 | Aspheric surface | 2.1853 | 0.3000 | 1.68 | 19.25 | −14.61 | −0.6312 |
| S8 | Aspheric surface | 1.6908 | 1.1179 | | | | −0.8442 |
| S9 | Aspheric surface | −5.6992 | 0.7427 | 1.55 | 56.11 | −39.45 | 0.0529 |
| S10 | Aspheric surface | −8.1068 | 0.0500 | | | | 3.7497 |
| S11 | Aspheric surface | 2.1205 | 0.4718 | 1.55 | 56.11 | 7.89 | −3.2273 |
| S12 | Aspheric surface | 3.8489 | 0.6929 | | | | 0.0000 |
| S13 | Aspheric surface | 3.5575 | 0.4527 | 1.55 | 56.11 | −6.51 | 0.0000 |
| S14 | Aspheric surface | 1.6977 | 0.6775 | | | | −5.9805 |
| S15 | Aspheric surface | Infinity | 0.2100 | 1.52 | 64.17 | | |
| S16 | Aspheric surface | Infinity | 0.4000 | | | | |
| S17 | Spherical surface | Infinity | | | | | |

In the example, the total effective focal length f of the optical imaging lens is 5.21 mm, the total length TTL of the optical imaging lens (i.e., the distance on the optical axis from the object side surface S1 of the first lens E1 to the imaging surface S17 of the optical imaging lens) is 7.24 mm, the half ImgH of the diagonal length of the effective pixel area on the imaging plane S17 of the optical imaging lens is 4.48 mm, the maximum semi field of view Semi-FOV of the optical imaging lens is 40.90 degree, and the aperture value Fno is 1.43.

In embodiment 1, the object side surface and the image side surface of any one of the first lens E1 to the seventh lens E7 are aspheric surfaces, and the surface type x of each aspheric lens can be defined by, but not limited to, the following aspheric formula:

$$x = \frac{ch^2}{1+\sqrt{1-(k+1)c^2h^2}} + \Sigma A_i h^i \quad (1)$$

Wherein x is the vector height of the distance from the aspheric surface vertex when the aspheric surface is at the position with the height of h along the optical axis direction; c is the paraxial curvature of the aspheric surface, c=1/R (i.e., paraxial curvature c is the reciprocal of the curvature radius R in Table 1 above); k is the cone coefficient; and $A_i$ is a correction coefficient of the i-th order of the aspherical surface. Table 2 below gives the coefficients of the high order terms that can be used for each of the aspheric surface mirror surface S1-S14 in embodiment 1, and the higher order term coefficients are A4, A6, A8, A10, A12, A14, A16, A18 and A20.

TABLE 2

| Surface number | A4 | A6 | A8 | A10 | A12 | A14 | A16 | A18 | A20 |
|---|---|---|---|---|---|---|---|---|---|
| S1 | −1.0926E−02 | 7.3639E−03 | −1.3720E−02 | 9.7621E−03 | −4.1960E−03 | 1.2474E−03 | −2.5836E−04 | 3.3941E−05 | −2.1526E−06 |
| S2 | 1.9825E−02 | −4.2493E−02 | 5.3226E−02 | −6.0097E−02 | 4.6387E−02 | −2.2015E−02 | 6.2153E−03 | −9.6056E−04 | 6.2466E−05 |
| S3 | 8.4466E−03 | −5.8498E−02 | 7.4538E−02 | −7.4450E−02 | 5.2572E−02 | −2.3787E−02 | 6.5294E−03 | −9.9121E−04 | 6.3831E−05 |
| S4 | −7.3413E−03 | −3.7318E−02 | 4.7052E−02 | −4.2753E−02 | 2.7997E−02 | −1.1992E−02 | 3.1536E−03 | −4.6280E−04 | 2.9077E−05 |
| S5 | 1.4850E−02 | −2.2832E−02 | 2.1661E−02 | −1.6891E−02 | 9.4447E−03 | −3.3546E−03 | 7.0957E−04 | −8.1028E−05 | 3.7491E−06 |
| S6 | 2.2281E−02 | −1.7852E−02 | 8.1830E−03 | −2.0111E−04 | −2.2430E−03 | 1.4197E−03 | −4.2780E−04 | 6.6323E−05 | −4.2840E−06 |
| S7 | −4.8194E−02 | 2.4620E−02 | −2.5939E−02 | 2.0868E−02 | −1.0761E−02 | 3.5218E−03 | −7.0638E−04 | 7.8735E−05 | −3.7141E−06 |
| S8 | −7.3373E−02 | 4.8673E−02 | −4.1568E−02 | 2.7430E−02 | −1.2113E−02 | 3.4425E−03 | −5.9420E−04 | 5.5166E−05 | −2.0134E−06 |
| S9 | 6.2451E−03 | −2.0067E−03 | 1.7358E−03 | −3.0278E−03 | 2.4113E−03 | −9.5359E−04 | 1.9744E−04 | −1.8756E−05 | 5.0100E−07 |
| S10 | −1.3810E−01 | 1.1943E−01 | −9.0781E−02 | 5.5454E−02 | −2.4898E−02 | 7.6784E−03 | −1.5163E−03 | 1.7145E−04 | −8.3753E−06 |
| S11 | −3.0144E−02 | 3.0439E−02 | −5.1871E−02 | 3.9505E−02 | −1.7936E−02 | 5.1130E−03 | −8.9847E−04 | 8.8217E−05 | −3.6601E−06 |
| S12 | 1.0364E−02 | −1.0746E−01 | 4.9252E−02 | −1.4704E−02 | 2.9614E−03 | −3.9995E−04 | 3.4704E−05 | −1.7388E−06 | 3.7963E−08 |
| S13 | −1.6213E−01 | 6.9808E−02 | −2.6720E−02 | 7.6058E−03 | −1.4017E−03 | 1.6133E−04 | −1.1241E−05 | 4.3504E−07 | −7.2013E−09 |
| S14 | −7.2417E−02 | 2.3587E−02 | −6.0441E−03 | 9.8424E−04 | −8.4974E−05 | 2.5848E−06 | 1.1935E−07 | −1.0645E−08 | 2.1235E−10 |

FIG. 2A shows an axial chromatic aberration curve of the optical imaging lens of embodiment 1, which represents a focus deviation of light rays with different wavelengths after passing through the lens. FIG. 2B shows an astigmatism curve of the optical imaging lens of embodiment 1, which represents a meridional image surface curvature and a sagittal image surface curvature. FIG. 2C shows a distortion curve of the optical imaging lens of embodiment 1, which represents distortion magnitude values corresponding to different image heights. FIG. 2D shows a magnification chromatic aberration curve of the optical imaging lens of embodiment 1, which represents the deviation of different image heights on the imaging plane after the light passes through the lens. As can be seen from FIG. 2A to FIG. 2D, the optical imaging lens according to embodiment 1 can achieve good imaging quality.

Embodiment 2

An optical imaging lens according to embodiment 2 of the application is described below with reference to FIG. 3 to FIG. 4D. In the embodiment and the following embodiments, part of the descriptions similar to embodiment 1 will be omitted for the sake of brevity. FIG. 3 shows a structural schematic diagram of the optical imaging lens according to embodiment 2 of the application.

As shown in FIG. 3, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a negative refractive power, and the object side surface S1 of the first lens is a convex surface and the image side surface S2 of the first lens is a concave surface. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from an object passes through each of the surfaces S1 to S16 in order and is finally imaged on the imaging plane S17. In the example, the total effective focal length f of the optical imaging lens is 5.34 mm, the total length TTL of the optical imaging lens is 7.28 mm, the half ImgH of the diagonal length of the effective pixel area on the imaging plane S17 of the optical imaging lens is 4.34 mm, the maximum semi field of view Semi-FOV of the optical imaging lens is 38.76 degree, and the aperture value Fno is 1.48.

Table 3 shows a basic parameter table of the optical imaging lens of embodiment 2, in which the units of the curvature radius, the thickness/distance, and the focal length are millimeters (mm). Table 4 shows the coefficients of the high order terms that can be used for each of the aspheric surface mirror surface in embodiment 2, wherein each aspheric surface type can be defined by the formula (1) given in embodiment 1 as described above.

TABLE 3

| Surface number | Surface type | Curvature Radius | Thickness/ distance | Materials Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.1403 | | | | |
| S1 | Aspheric surface | 5.3528 | 0.2000 | 1.55 | 56.11 | −500.00 | 0.6387 |
| S2 | Aspheric surface | 5.1806 | 0.0500 | | | | −11.5419 |
| S3 | Aspheric surface | 3.0397 | 0.2302 | 1.68 | 19.25 | −21.11 | −4.9107 |
| S4 | Aspheric surface | 2.4304 | 0.0862 | | | | −1.9174 |
| S5 | Aspheric surface | 4.0518 | 1.2555 | 1.55 | 56.11 | 3.90 | 0.0000 |
| S6 | Aspheric surface | −3.9946 | 0.0500 | | | | 0.3418 |
| S7 | Aspheric surface | 2.1578 | 0.2225 | 1.68 | 19.25 | −14.58 | −0.6192 |
| S8 | Aspheric surface | 1.6972 | 1.3198 | | | | −0.8250 |
| S9 | Aspheric surface | −7.3885 | 0.7152 | 1.55 | 56.11 | −29.59 | 1.1383 |
| S10 | Aspheric surface | −14.0827 | 0.1218 | | | | 18.0234 |
| S11 | Aspheric surface | 2.0179 | 0.5953 | 1.55 | 56.11 | 7.79 | −4.1569 |
| S12 | Aspheric surface | 3.4384 | 0.8010 | | | | 0.0000 |
| S13 | Aspheric surface | 3.7373 | 0.4771 | 1.55 | 56.11 | −6.81 | 0.0000 |
| S14 | Aspheric surface | 1.7804 | 0.5455 | | | | −5.1996 |
| S15 | Aspheric surface | Infinity | 0.2100 | 1.52 | 64.17 | | |
| S16 | Aspheric surface | Infinity | 0.4034 | | | | |
| S17 | Spherical surface | Infinity | | | | | |

TABLE 4

| Surface number | A4 | A6 | A8 | A10 | A12 | A14 | A16 | A18 | A20 |
|---|---|---|---|---|---|---|---|---|---|
| S1 | −1.2717E−02 | 2.0542E−02 | −4.3964E−02 | 4.0297E−02 | −2.1989E−02 | 7.7099E−03 | −1.7014E−03 | 2.1408E−04 | −1.1687E−05 |
| S2 | −1.1830E−02 | 8.2328E−02 | −1.5491E−01 | 1.4595E−01 | −8.3266E−02 | 3.0189E−02 | −6.7914E−03 | 8.6228E−04 | −4.7209E−05 |
| S3 | −3.0002E−02 | 4.2315E−02 | −7.6310E−02 | 7.7288E−02 | −4.7216E−02 | 1.7961E−02 | −4.1688E−03 | 5.3989E−04 | −2.9891E−05 |
| S4 | −1.4585E−02 | −2.6206E−02 | 1.2300E−02 | 9.8801E−03 | −1.2409E−02 | 5.6749E−03 | −1.3720E−03 | 1.7474E−04 | −9.2362E−06 |
| S5 | 2.1603E−02 | −2.3191E−02 | −1.0820E−02 | 3.2390E−02 | −2.4516E−02 | 9.7752E−03 | −2.2486E−03 | 2.8394E−04 | −1.5370E−05 |
| S6 | 3.8651E−02 | −4.8088E−02 | 4.1311E−02 | −2.5071E−02 | 1.0502E−02 | −2.9295E−03 | 5.1517E−04 | −5.0972E−05 | 2.0872E−06 |
| S7 | −4.5116E−02 | 2.1287E−02 | −2.7127E−02 | 2.5433E−02 | −1.4587E−02 | 5.2329E−03 | −1.1501E−03 | 1.4123E−04 | −7.4011E−06 |
| S8 | −8.4154E−02 | 7.3472E−02 | −7.8032E−02 | 6.1688E−02 | −3.2646E−02 | 1.1319E−02 | −2.4623E−03 | 3.0369E−04 | −1.6145E−05 |

TABLE 4-continued

| Surface number | A 4 | A 6 | A 8 | A 10 | A 12 | A 14 | A 16 | A 18 | A 20 |
|---|---|---|---|---|---|---|---|---|---|
| S9  | 9.2892E−03  | −8.8474E−03 | 6.9247E−03  | −4.6214E−03 | 2.2832E−03  | −7.2678E−04 | 1.4065E−04  | −1.4611E−05 | 6.0170E−07  |
| S10 | −1.1345E−01 | 7.8391E−02  | −4.9937E−02 | 2.6923E−02  | −1.1030E−02 | 3.1694E−03  | −5.9091E−04 | 6.3790E−05  | −3.0055E−06 |
| S11 | −3.8958E−02 | 2.5266E−02  | −3.0867E−02 | 2.0375E−02  | −8.3753E−03 | 2.1938E−03  | −3.5757E−04 | 3.2765E−05  | −1.2748E−06 |
| S12 | 3.7073E−02  | −5.2047E−02 | 2.2242E−02  | −6.1417E−03 | 1.1413E−03  | −1.4278E−04 | 1.1657E−05  | −5.6270E−07 | 1.2110E−08  |
| S13 | −1.3471E−01 | 4.8622E−02  | −1.5394E−02 | 3.7640E−03  | −6.1280E−04 | 6.3323E−05  | −4.0048E−06 | 1.4187E−07  | −2.1639E−09 |
| S14 | −6.4558E−02 | 2.3109E−02  | −6.4740E−03 | 1.2694E−03  | −1.6165E−04 | 1.3076E−05  | −6.5053E−07 | 1.8213E−08  | −2.2035E−10 |

Figure 4B:
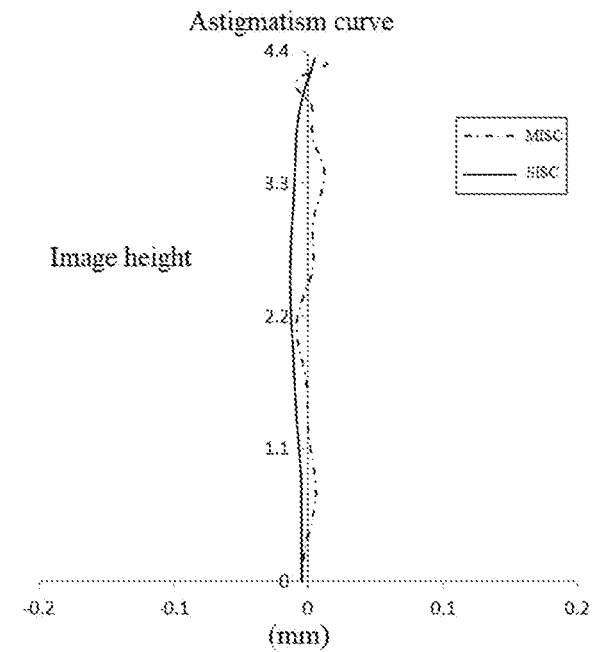
Figure 4C:
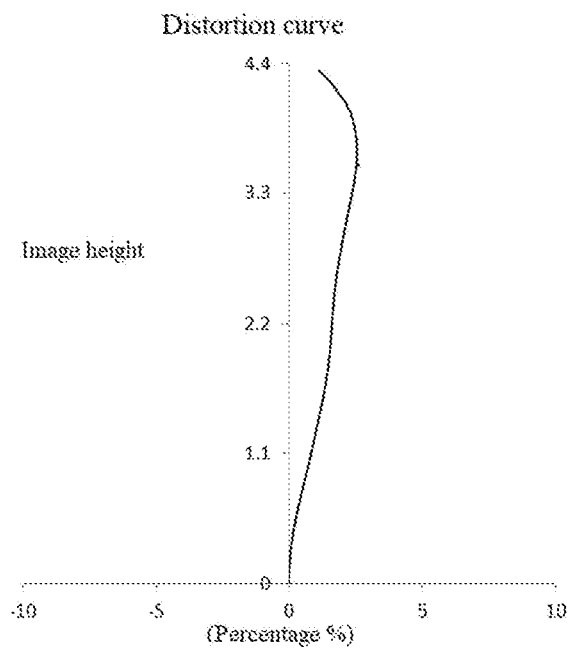
Figure 4D:
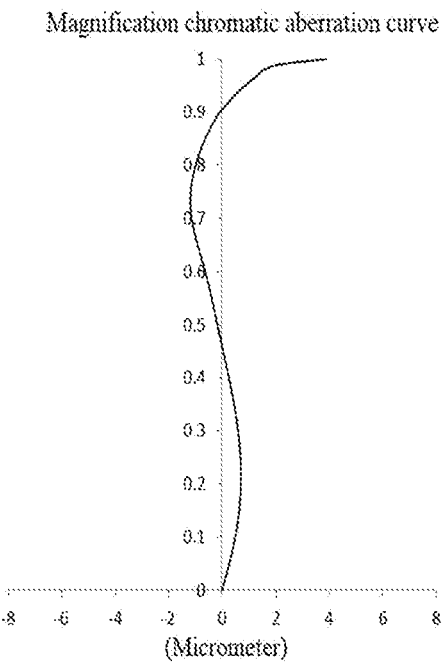

FIG. 4A shows an axial chromatic aberration curve of the optical imaging lens of embodiment 2, which represents a focus deviation of light rays with different wavelengths after passing through the lens. FIG. 4B shows an astigmatism curve of the optical imaging lens of embodiment 2, which represents a meridional image surface curvature and a sagittal image surface curvature. FIG. 4C shows a distortion curve of the optical imaging lens of embodiment 2, which represents distortion magnitude values corresponding to different image heights. FIG. 4D shows a magnification chromatic aberration curve of the optical imaging lens of embodiment 2, which represents the deviation of different image heights on the imaging plane after the light passes through the lens. As can be seen from FIG. 4A to FIG. 4D, the optical imaging lens according to embodiment 2 can achieve good imaging quality.

Embodiment 3

Figure 5:
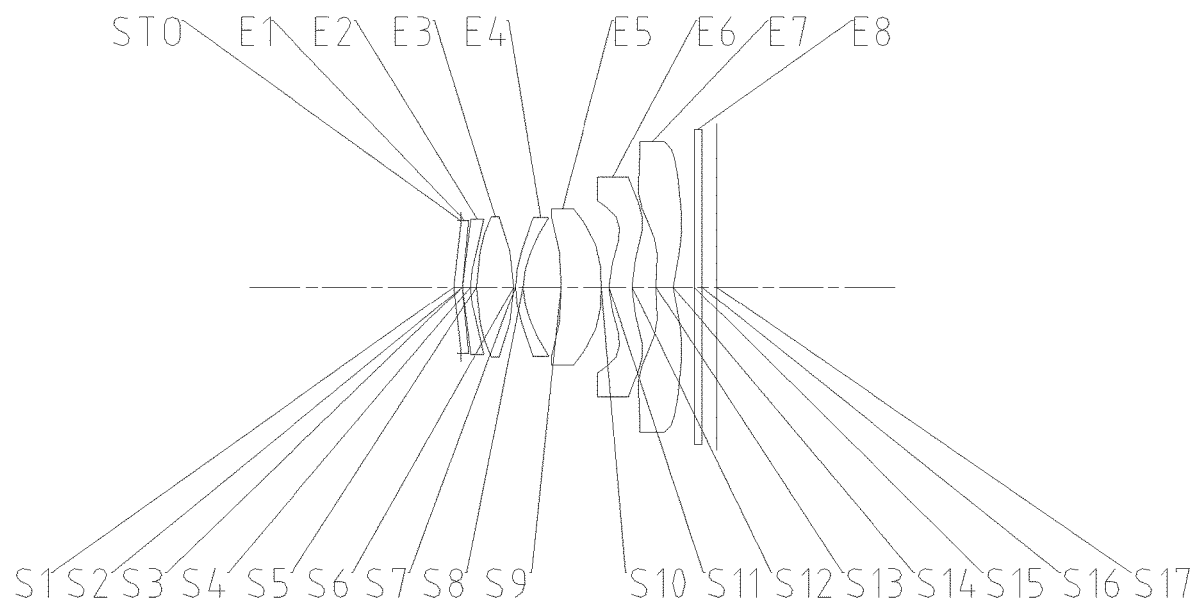
FIG. 5 is a structural schematic diagram of an optical imaging lens according to embodiment 3 of the application.

An optical imaging lens according to embodiment 3 of the application is described below with reference to FIG. 5 to FIG. 6D. FIG. 5 shows a structural schematic structural diagram of the optical imaging lens according to embodiment 3 of the application.

As shown in FIG. 5, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a negative refractive power, and the object side surface S1 of the first lens is a convex surface and the image side surface S2 of the first lens is a concave surface. The second lens E2 has a positive refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from an object passes through each of the surfaces S1 to S16 in order and is finally imaged on the imaging plane S17.

In the example, the total effective focal length f of the optical imaging lens is 5.29 mm, the total length TTL of the optical imaging lens is 7.25 mm, the half ImgH of the diagonal length of the effective pixel area on the imaging plane S17 of the optical imaging lens is 4.48 mm, the maximum semi field of view Semi-FOV of the optical imaging lens is 39.73 degree, and the aperture value Fno is 1.45.

Table 5 shows a basic parameter table of the optical imaging lens of embodiment 3, in which the units of the curvature radius, the thickness/distance, and the focal length are millimeters (mm). Table 6 shows the coefficients of the high order terms that can be used for each of the aspheric surface mirror surface in embodiment 3, wherein each aspheric surface type can be defined by the formula (1) given in embodiment 1 as described above.

TABLE 5

| | | | | Materials | | | |
|---|---|---|---|---|---|---|---|
| Surface number | Surface type | Curvature Radius | Thickness/ distance | Refractive index | Abbe number | Focal length | Cone coefficient |
| OBJ | Spherical surface | Infinity | Infinity | | | | |
| STO | Spherical surface | Infinity | −0.1826 | | | | |
| S1  | Aspheric surface | 4.5397   | 0.2393 | 1.55 | 56.11 | −135.62 | 0.2596 |
| S2  | Aspheric surface | 4.1978   | 0.0001 | | | | −34.3204 |
| S3  | Aspheric surface | 2.6894   | 0.2200 | 1.68 | 19.25 | 994.55 | −6.3143 |
| S4  | Aspheric surface | 2.6109   | 0.1587 | | | | −1.9131 |
| S5  | Aspheric surface | 4.7960   | 1.0277 | 1.55 | 56.11 | 4.09 | 0.0000 |
| S6  | Aspheric surface | −3.8610  | 0.0500 | | | | −0.5380 |
| S7  | Aspheric surface | 2.5632   | 0.2100 | 1.68 | 19.25 | −10.13 | −0.4872 |
| S8  | Aspheric surface | 1.8043   | 1.0492 | | | | −0.8004 |
| S9  | Aspheric surface | −9.7572  | 1.1200 | 1.55 | 56.11 | −40.10 | 16.8064 |
| S10 | Aspheric surface | −18.3172 | 0.2155 | | | | 58.8405 |
| S11 | Aspheric surface | 1.9989   | 0.6335 | 1.55 | 56.11 | 7.42 | −3.8281 |
| S12 | Aspheric surface | 3.5047   | 0.6584 | | | | 0.0000 |

TABLE 5-continued

| Surface number | Surface type | Curvature Radius | Thickness/ distance | Materials Refractive index | Abbe number | Focal length | Cone coefficient |
|---|---|---|---|---|---|---|---|
| S13 | Aspheric surface | 3.6601 | 0.4766 | 1.55 | 56.11 | −6.38 | 0.0000 |
| S14 | Aspheric surface | 1.7025 | 0.5810 | | | | −5.2077 |
| S15 | Aspheric surface | Infinity | 0.2100 | 1.52 | 64.17 | | |
| S16 | Aspheric surface | Infinity | 0.3999 | | | | |
| S17 | Spherical surface | Infinity | | | | | |

TABLE 6

| Surface number | A 4 | A 6 | A 8 | A 10 | A 12 | A 14 | A 16 | A 18 | A 20 |
|---|---|---|---|---|---|---|---|---|---|
| S1 | −5.7349E−03 | −3.9039E−02 | 8.4390E−02 | −9.9153E−02 | 6.7201E−02 | −2.7591E−02 | 6.8220E−03 | −9.3599E−04 | 5.4672E−05 |
| S2 | −9.4658E−02 | 1.9973E−01 | −1.8821E−01 | 8.3796E−02 | −8.5232E−03 | −8.5482E−03 | 4.1343E−03 | −7.6244E−04 | 5.2317E−05 |
| S3 | −1.0088E−01 | 1.9209E−01 | −2.3173E−01 | 1.7007E−01 | −7.7964E−02 | 2.1971E−02 | −3.6027E−03 | 3.0398E−04 | −9.6143E−06 |
| S4 | −3.1782E−03 | −2.3546E−02 | −1.3168E−02 | 3.4099E−02 | −2.2181E−02 | 7.0254E−03 | −1.1230E−03 | 7.3140E−05 | −9.4304E−08 |
| S5 | 9.0375E−03 | 1.3727E−02 | −5.3498E−02 | 5.2943E−02 | −2.6038E−02 | 7.2901E−03 | −1.1788E−03 | 1.0223E−04 | −3.6932E−06 |
| S6 | 8.8267E−02 | −1.2915E−01 | 1.2122E−01 | −7.8756E−02 | 3.5215E−02 | −1.0519E−02 | 1.9907E−03 | −2.1441E−04 | 9.9344E−06 |
| S7 | −1.2544E−02 | −1.5019E−02 | −1.3787E−02 | 3.1595E−02 | −2.2944E−02 | 9.0103E−03 | −2.0514E−03 | 2.5515E−04 | −1.3430E−05 |
| S8 | −9.3482E−02 | 1.0819E−01 | −1.4194E−01 | 1.2474E−01 | −6.9539E−02 | 2.4638E−02 | −5.3899E−03 | 6.6441E−04 | −3.5283E−05 |
| S9 | −4.7905E−03 | 5.9749E−03 | −1.1900E−02 | 1.2421E−02 | −7.9203E−03 | 3.1759E−03 | −7.7485E−04 | 1.0515E−04 | −6.0627E−06 |
| S10 | −1.0203E−01 | 4.8055E−02 | −1.7700E−02 | 4.6556E−03 | −7.5016E−04 | 1.4272E−05 | −2.9679E−06 | 1.0035E−05 | 1.9560E−07 |
| S11 | −2.2984E−02 | 2.1960E−03 | −7.8534E−03 | 5.7807E−03 | −2.4000E−03 | 6.2804E−04 | −1.0488E−04 | 1.0035E−05 | −4.0612E−07 |
| S12 | 3.0809E−02 | −4.0716E−02 | 1.4537E−02 | −3.0989E−03 | 3.7326E−04 | −1.8482E−05 | −6.5164E−07 | 1.1152E−07 | −3.4746E−09 |
| S13 | −1.6011E−01 | 6.2358E−02 | −2.0536E−02 | 5.1935E−03 | −8.7763E−04 | 9.4376E−05 | −6.2186E−06 | 2.2961E−07 | −3.6498E−09 |
| S14 | −7.6524E−02 | 3.0014E−02 | −8.9129E−03 | 1.8662E−03 | −2.5529E−04 | 2.2119E−05 | −1.1698E−06 | 3.4497E−08 | −4.3554E−10 |

Figures 6A, 6B:
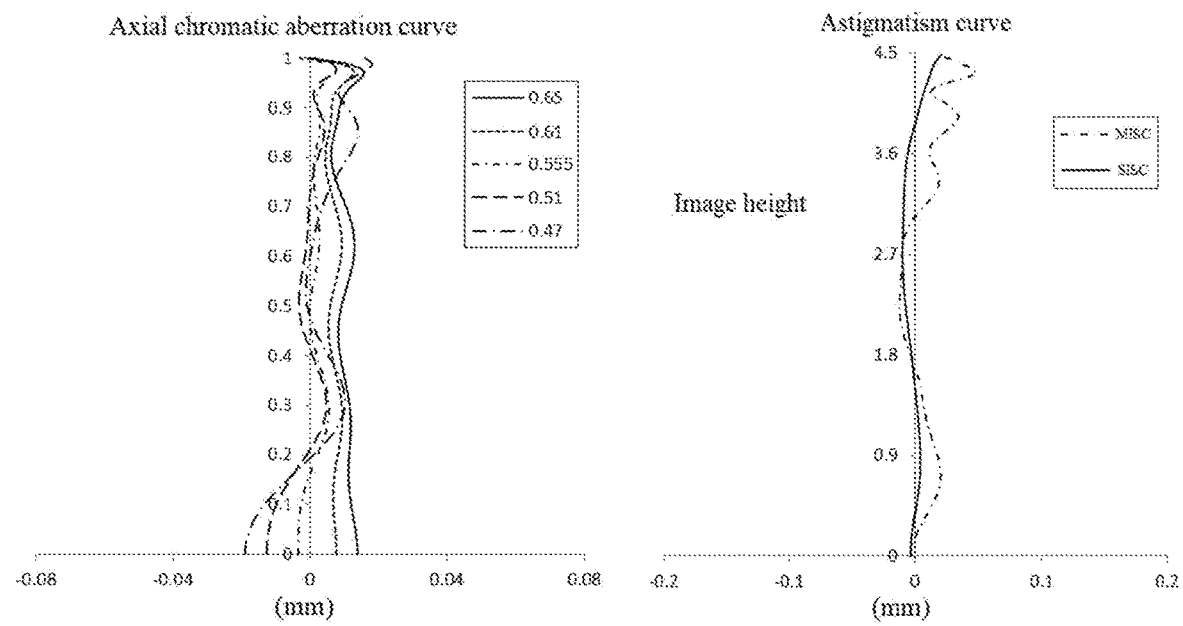
FIG. 6A to FIG. 6D show an axial chromatic aberration curve, an astigmatism curve, a distortion curve and a magnification chromatic aberration curve of an optical imaging lens of embodiment 3, respectively.
Figure 6C:
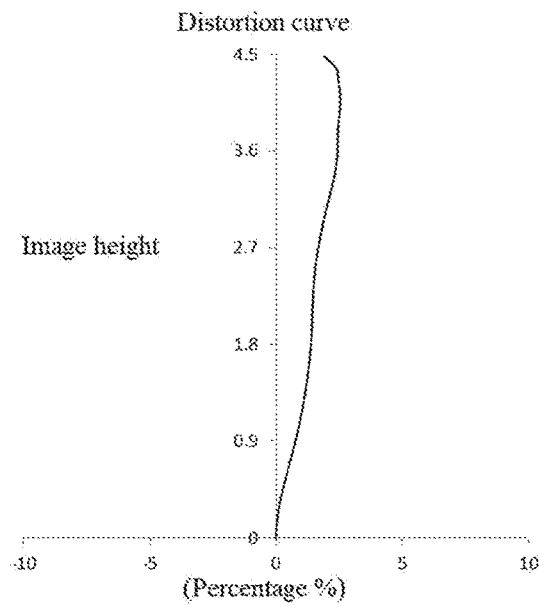
Figure 6D:
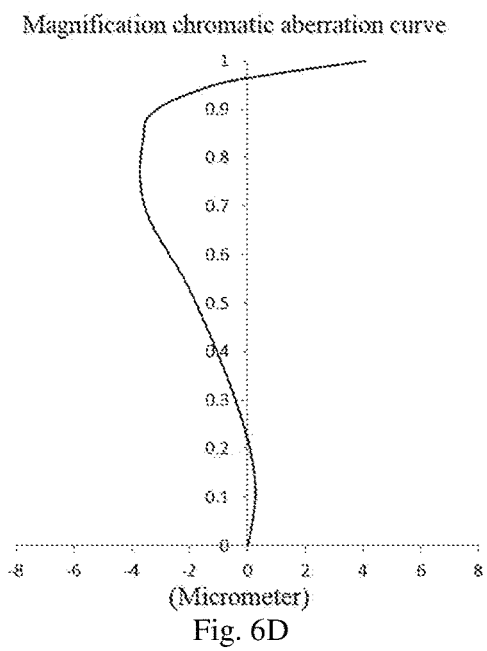

FIG. 6A shows an axial chromatic aberration curve of the optical imaging lens of embodiment 3, which represents a focus deviation of light rays with different wavelengths after passing through the lens. FIG. 6B shows an astigmatism curve of the optical imaging lens of embodiment 3, which represents a meridional image surface curvature and a sagittal image surface curvature. FIG. 6C shows a distortion curve of the optical imaging lens of embodiment 3, which represents distortion magnitude values corresponding to different image heights. FIG. 6D shows a magnification chromatic aberration curve of the optical imaging lens of embodiment 3, which represents the deviation of different image heights on the imaging plane after the light passes through the lens. As can be seen from FIG. 6A to FIG. 6D, the optical imaging lens according to embodiment 3 can achieve good imaging quality.

Embodiment 4

Figure 7:
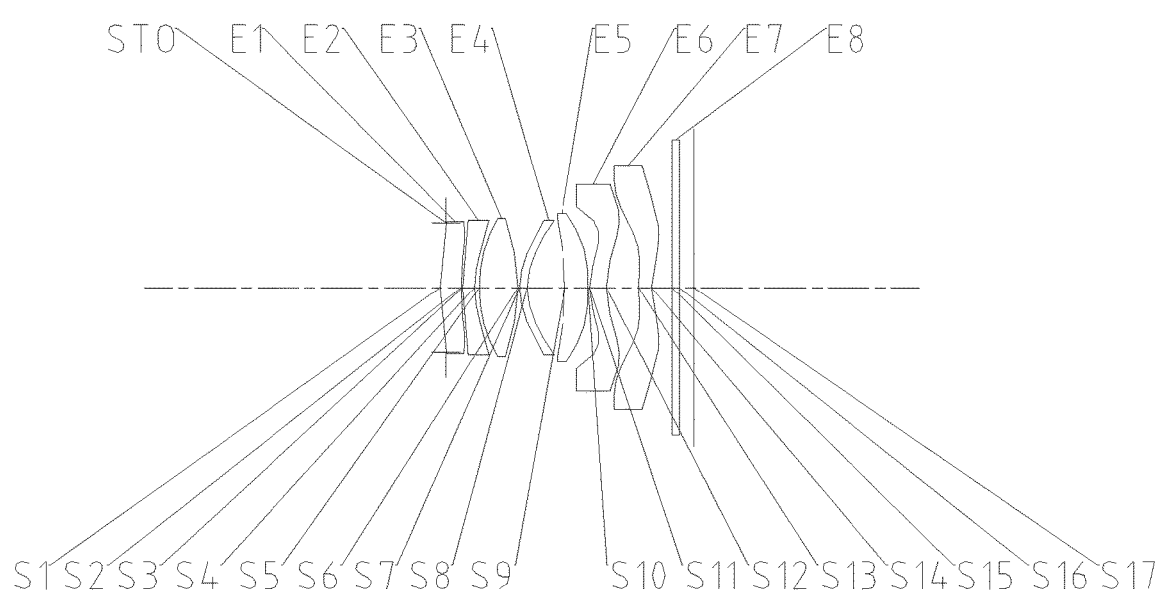
FIG. 7 is a structural schematic diagram of an optical imaging lens according to embodiment 4 of the application.

An optical imaging lens according to embodiment 4 of the application is described below with reference to FIG. 7 to FIG. 8D. FIG. 7 shows a structural schematic diagram of the optical imaging lens according to embodiment 4 of the application.

As shown in FIG. 7, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens is a convex surface and the image side surface S2 of the first lens is a concave surface. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a positive refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from the object passes through each of the surfaces S1 to S16 in order and is finally imaged on the imaging plane S17.

In the example, the total effective focal length f of the optical imaging lens is 5.29 mm, the total length TTL of the optical imaging lens is 7.20 mm, the half ImgH of the diagonal length of the effective pixel area on the imaging plane S17 of the optical imaging lens is 4.48 mm, the maximum semi field of view Semi-FOV of the optical imaging lens is 39.57 degree, and the aperture value Fno is 1.44.

Table 7 shows a basic parameter table of the optical imaging lens of embodiment 4, in which the units of the curvature radius, the thickness/distance, and the focal length are millimeters (mm). Table 8 shows the coefficients of the high order terms that can be used for each of the aspheric surface mirror surface in embodiment 4, wherein each aspheric surface type can be defined by the formula (1) given in embodiment 1 as described above.

TABLE 7

| Surface number | Surface type | Curvature Radius | Thickness/ distance | Materials Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.1579 | | | | |
| S1 | Aspheric surface | 4.5726 | 0.5937 | 1.55 | 56.11 | 17.70 | 0.1392 |
| S2 | Aspheric surface | 8.2812 | 0.0508 | | | | −18.2388 |
| S3 | Aspheric surface | 4.8069 | 0.3311 | 1.68 | 19.25 | −8.62 | −3.5663 |
| S4 | Aspheric surface | 2.5638 | 0.1347 | | | | −1.7855 |
| S5 | Aspheric surface | 4.1201 | 1.0966 | 1.55 | 56.11 | 4.43 | 0.0000 |
| S6 | Aspheric surface | −5.3200 | 0.0500 | | | | 0.6741 |
| S7 | Aspheric surface | 1.9118 | 0.2100 | 1.68 | 19.25 | 497.38 | −0.6704 |
| S8 | Aspheric surface | 1.8374 | 1.0790 | | | | −0.7679 |
| S9 | Aspheric surface | −8.0019 | 0.6648 | 1.55 | 56.11 | −22.42 | 6.3460 |
| S10 | Aspheric surface | −23.7972 | 0.0500 | | | | 99.0000 |
| S11 | Aspheric surface | 1.9604 | 0.4701 | 1.55 | 56.11 | 8.18 | −3.6151 |
| S12 | Aspheric surface | 3.1999 | 0.9132 | | | | 0.0000 |
| S13 | Aspheric surface | 3.4567 | 0.3646 | 1.55 | 56.11 | −6.22 | 0.0000 |
| S14 | Aspheric surface | 1.6496 | 0.5823 | | | | −5.4416 |
| S15 | Aspheric surface | Infinity | 0.2100 | 1.52 | 64.17 | | |
| S16 | Aspheric surface | Infinity | 0.4035 | | | | |
| S17 | Spherical surface | Infinity | | | | | |

TABLE 8

| Surface number | A 4 | A 6 | A 8 | A 10 | A 12 | A 14 | A 16 | A 18 | A 20 |
|---|---|---|---|---|---|---|---|---|---|
| S1 | 3.9842E−03 | 2.1668E−02 | −2.1948E−0 | 1.5922E−02 | −8.1137E−03 | 2.7064E−03 | −5.6073E−04 | 6.5156E−05 | −3.2340E−06 |
| S2 | 1.5274E−02 | 1.9110E−02 | −1.9459E−02 | 1.7006E−02 | −1.1029E−02 | 4.6131E−03 | −1.1706E−03 | 1.5998E−04 | −8.5950E−06 |
| S3 | 3.6990E−02 | −1.1518E−01 | 1.7889E−01 | −1.9244E−01 | 1.4076E−01 | −6.8814E−02 | 2.1433E−02 | −3.8287E−03 | 2.9929E−04 |
| S4 | −5.1244E−02 | 1.2477E−02 | 1.9295E−02 | −6.6400E−02 | 9.6042E−02 | −8.0231E−02 | 3.9733E−02 | −1.0784E−02 | 1.2416E−03 |
| S5 | −1.6603E−02 | −4.0201E−03 | 5.6389E−04 | −5.7330E−04 | −1.9123E−03 | 3.0100E−03 | −1.9493E−03 | 6.0621E−04 | −7.1351E−05 |
| S6 | −1.4153E−02 | −1.0278E−02 | 1.6228E−02 | −2.6335E−02 | 2.6071E−02 | −1.6427E−02 | 6.3711E−03 | −1.3890E−03 | 1.3103E−04 |
| S7 | 7.9365E−03 | −3.0595E−02 | 1.6860E−02 | 5.5535E−03 | −1.1365E−02 | 6.7826E−03 | −2.0592E−03 | 3.1962E−04 | −1.9842E−05 |
| S8 | 7.5543E−02 | −1.3190E−01 | 8.5313E−02 | −3.4285E−02 | 9.5397E−03 | −1.8549E−03 | 2.5069E−04 | −2.2512E−05 | 1.0544E−06 |
| S9 | 9.9108E−02 | −1.0219E−01 | 6.1192E−02 | −2.6173E−02 | 7.9931E−03 | −1.6878E−03 | 2.3146E−04 | −1.8412E−05 | 6.4132E−07 |
| S10 | −4.3624E−02 | 4.5745E−02 | −1.9945E−02 | 3.5880E−03 | 1.8851E−04 | −2.1426E−04 | 4.1153E−05 | −3.5050E−06 | 1.1494E−07 |
| S11 | 2.3975E−02 | −1.6016E−02 | 2.7652E−05 | 2.0030E−03 | −7.5763E−04 | 1.4138E−04 | −1.4913E−05 | 8.4473E−07 | −1.9873E−08 |
| S12 | 5.9828E−02 | −5.0112E−02 | 1.7345E−02 | −3.7258E−03 | 5.2345E−04 | −4.8210E−05 | 2.7991E−06 | −9.2536E−08 | 1.3222E−09 |
| S13 | −8.7968E−02 | 4.0350E−03 | 1.7379E−03 | −3.7674E−04 | 3.7492E−05 | −2.1814E−06 | 7.6101E−08 | −1.4806E−09 | 1.2388E−11 |
| S14 | −1.1574E−01 | 2.1345E−02 | −2.7138E−03 | 2.3530E−04 | −1.3756E−05 | 5.3192E−07 | −1.3055E−08 | 1.8486E−10 | −1.1559E−12 |

Figure 8A:
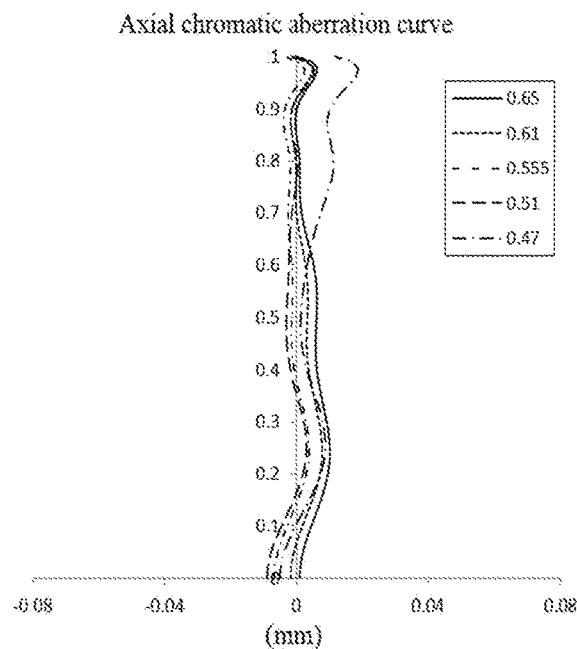
FIG. 8A to FIG. 8D show an axial chromatic aberration curve, an astigmatism curve, a distortion curve and a magnification chromatic aberration curve of an optical imaging lens of embodiment 4, respectively.
Figure 8B:
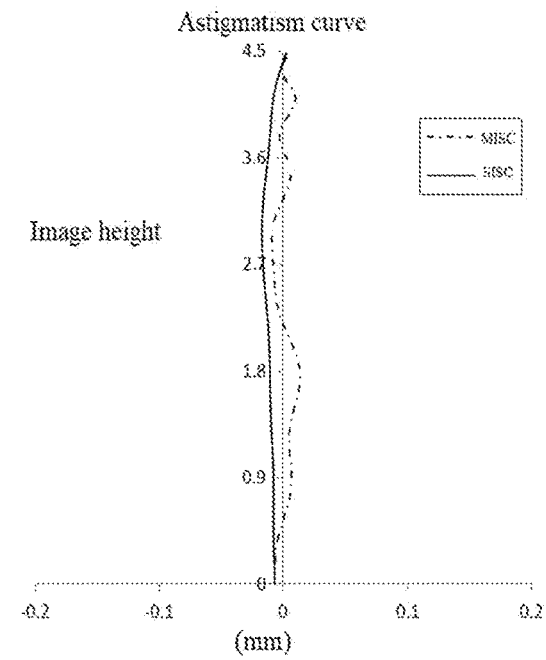
Figure 8C:
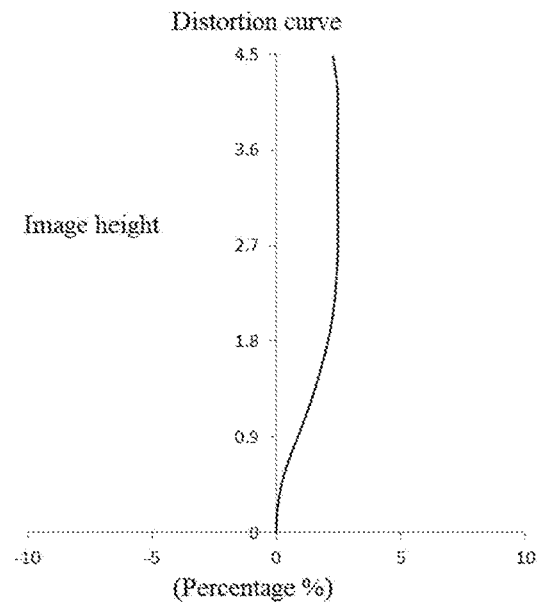
Figure 8D:
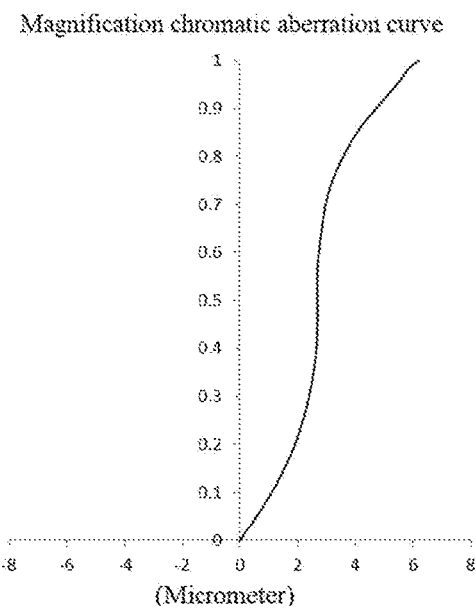

FIG. 8A shows axial chromatic aberration curve of the optical imaging lens of embodiment 4, which represents the focus deviation of light rays with different wavelengths after passing through the lens. FIG. 8B shows an astigmatism curve of the optical imaging lens of embodiment 4, which represents a meridional image surface curvature and a sagittal image surface curvature. FIG. 8C shows a distortion curve of the optical imaging lens of embodiment 4, which represents distortion magnitude values corresponding to different image heights. FIG. 8D shows a magnification chromatic aberration curve of the optical imaging lens of embodiment 4, which represents the deviation of different image heights on the imaging plane after the light passes through the lens. As can be seen from FIG. 8A to FIG. 8D, the optical imaging lens according to embodiment 4 can achieve good imaging quality.

Embodiment 5

Figure 9:
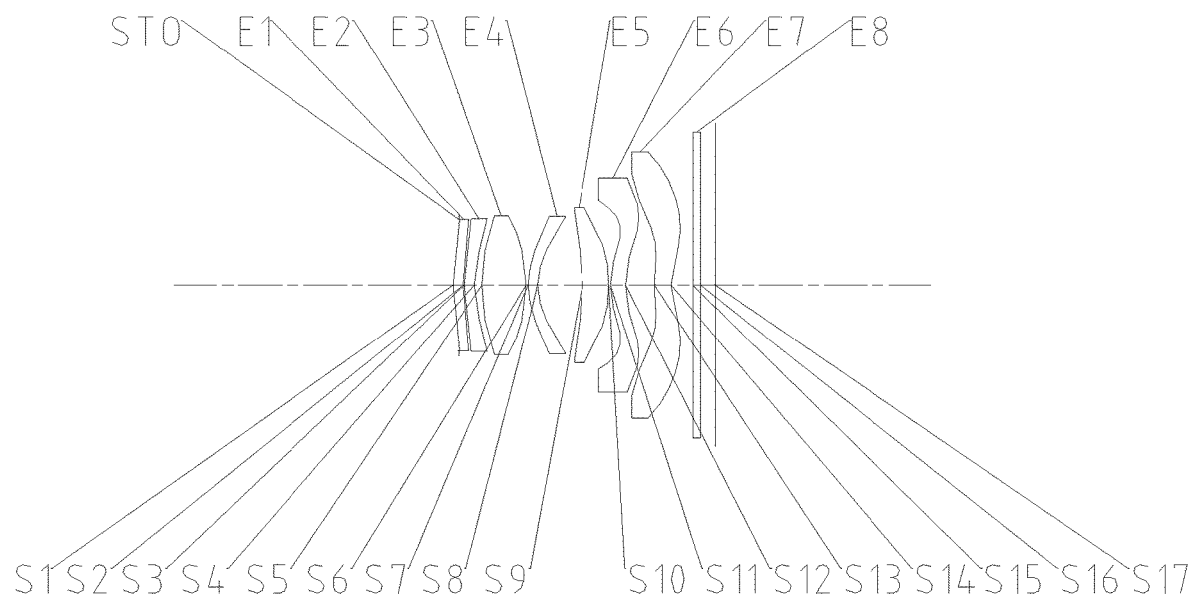
FIG. 9 is a structural schematic diagram of an optical imaging lens according to embodiment 5 of the application.

An optical imaging lens according to embodiment 5 of the application is described below with reference to FIG. 9 to FIG. 10D. FIG. 9 shows a structural schematic diagram of the optical imaging lens according to embodiment 5 of the application.

As shown in FIG. 9, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens is a convex surface and the image side surface S2 of the first lens is a concave surface. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a positive refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from the object passes through each of the surfaces S1 to S16 in order and is finally imaged on the imaging plane S17.

In the example, the total effective focal length f of the optical imaging lens is 5.25 mm, the total length TTL of the optical imaging lens is 7.25 mm, the half ImgH of the diagonal length of the effective pixel area on the imaging plane S17 of the optical imaging lens is 4.47 mm, the maximum semi field of view Semi-FOV of the optical imaging lens is 39.60 degree, and the aperture value Fno is 1.44.

Table 9 shows a basic parameter table of the optical imaging lens of embodiment 5, in which the units of the curvature radius, the thickness/distance, and the focal length are millimeters (mm). Table 10 shows the coefficients of the high order terms that can be used for each of the aspheric surface mirror surface in embodiment 5, wherein each aspheric surface type can be defined by the formula (1) given in embodiment 1 as described above.

Figures 10A, 10B:
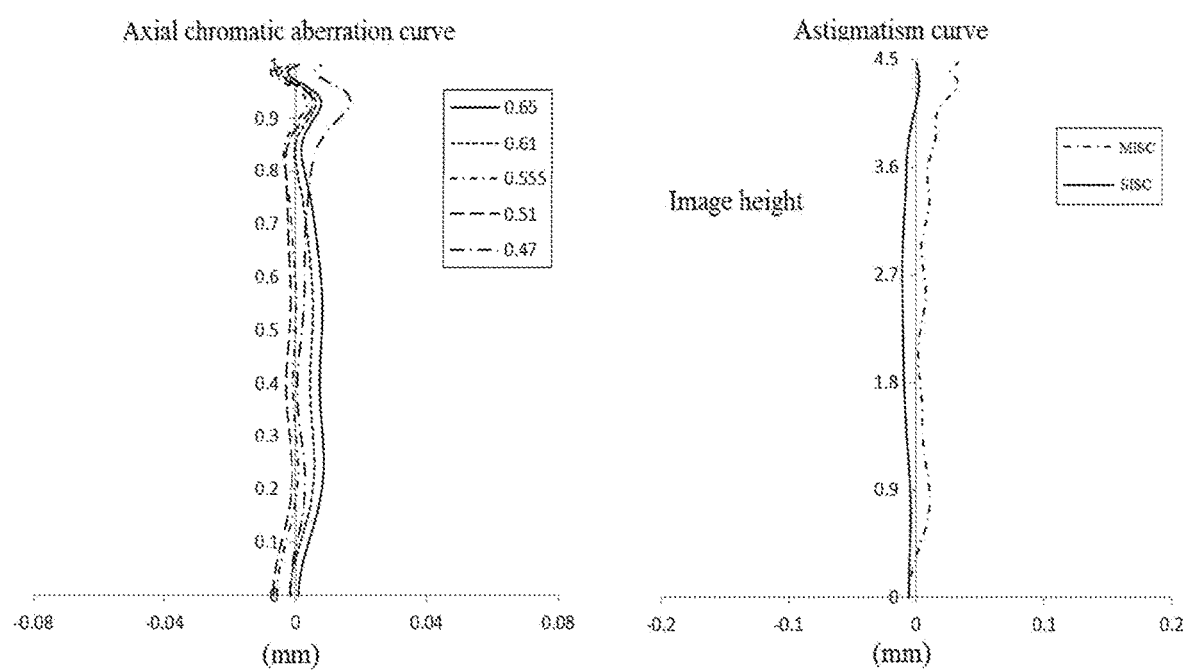
FIG. 10A to FIG. 10D show an axial chromatic aberration curve, an astigmatism curve, a distortion curve and a magnification chromatic aberration curve of an optical imaging lens of embodiment 5, respectively.
Figure 10C:
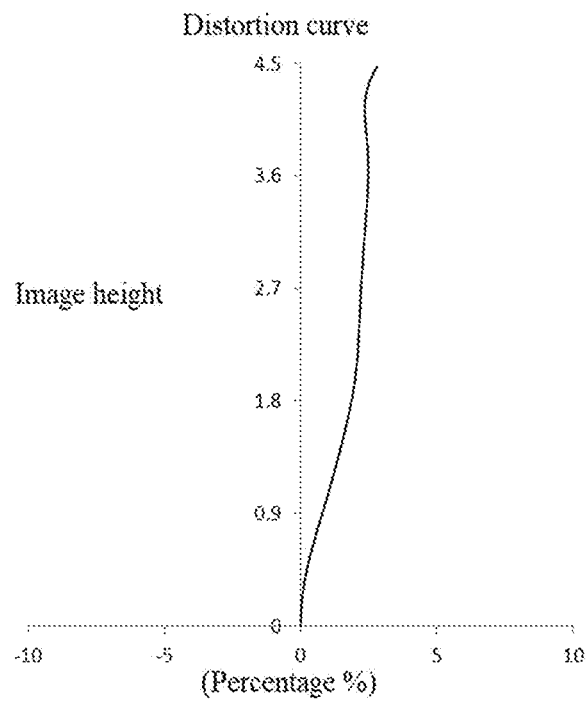
Figure 10D:
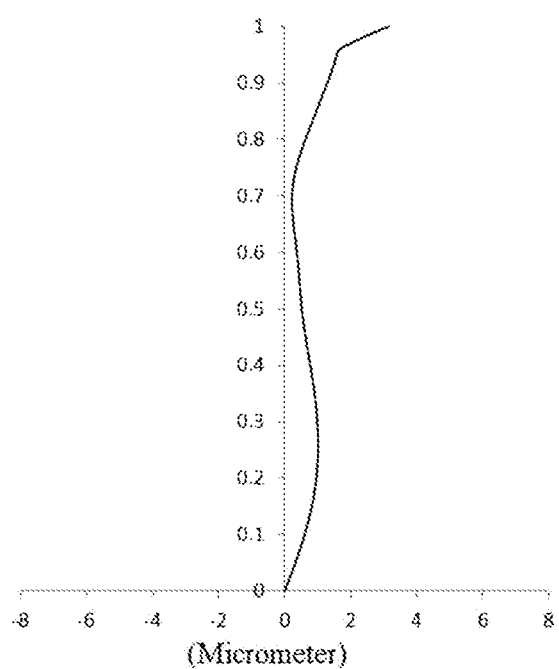

FIG. 10A shows an axial chromatic aberration curve of the optical imaging lens of embodiment 5, which represents a focus deviation of light rays with different wavelengths after passing through the lens. FIG. 10B shows an astigmatism curve of the optical imaging lens of embodiment 5, which represents a meridional image surface curvature and a sagittal image surface curvature. FIG. 10C shows a distortion curve of the optical imaging lens of embodiment 5, which represents distortion magnitude values corresponding to different image heights. FIG. 10D shows a magnification chromatic aberration curve of the optical imaging lens of embodiment 5, which represents the deviation of different image heights on the imaging plane after the light passes through the lens. As can be seen from FIG. 10A to FIG. 10D, the optical imaging lens according to embodiment 5 can achieve good imaging quality.

Embodiment 6

Figure 11:
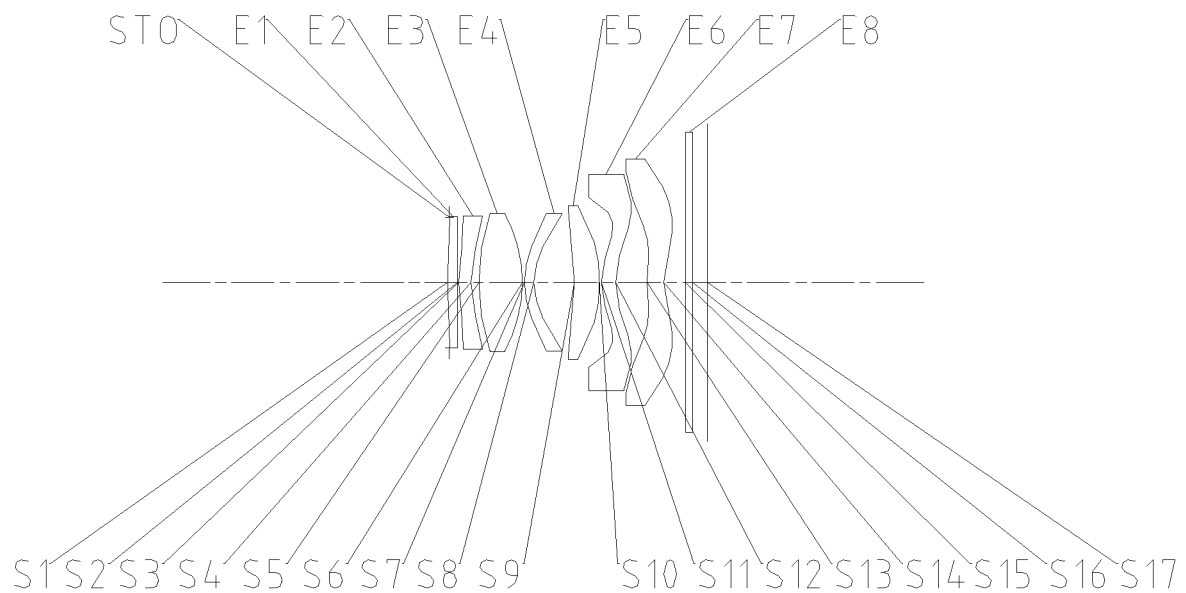
FIG. 11 is a structural schematic diagram of an optical imaging lens according to embodiment 6 of the application.

An optical imaging lens according to embodiment 6 of the application is described below with reference to FIG. 11 to FIG. 12D. FIG. 11 shows a structural schematic structural diagram of the optical imaging lens according to embodiment 6 of the application.

TABLE 9

| Surface number | Surface type | Curvature Radius | Thickness/distance | Materials Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.1665 | | | | |
| S1 | Aspheric surface | 5.2643 | 0.2800 | 1.55 | 56.11 | 24.68 | 1.2002 |
| S2 | Aspheric surface | 8.4770 | 0.0300 | | | | −9.7061 |
| S3 | Aspheric surface | 3.7720 | 0.2700 | 1.68 | 19.25 | −15.64 | −4.6744 |
| S4 | Aspheric surface | 2.7015 | 0.2153 | | | | −1.8276 |
| S5 | Aspheric surface | 5.4210 | 1.2257 | 1.55 | 56.11 | 4.24 | 0.0000 |
| S6 | Aspheric surface | −3.7240 | 0.0500 | | | | 0.4298 |
| S7 | Aspheric surface | 2.1642 | 0.2672 | 1.68 | 19.25 | −14.90 | −0.6136 |
| S8 | Aspheric surface | 1.6934 | 1.2420 | | | | −0.8319 |
| S9 | Aspheric surface | −7.1891 | 0.7287 | 1.55 | 56.11 | 66046.38 | 1.8397 |
| S10 | Aspheric surface | −7.4449 | 0.0503 | | | | −2.2575 |
| S11 | Aspheric surface | 2.1968 | 0.4180 | 1.55 | 56.11 | 10.19 | −3.1536 |
| S12 | Aspheric surface | 3.3859 | 0.8007 | | | | 0.0000 |
| S13 | Aspheric surface | 3.5651 | 0.4613 | 1.55 | 56.11 | −6.65 | 0.0000 |
| S14 | Aspheric surface | 1.7164 | 0.6002 | | | | −5.1890 |
| S15 | Aspheric surface | Infinity | 0.2100 | 1.52 | 64.17 | | |
| S16 | Aspheric surface | Infinity | 0.4036 | | | | |
| S17 | Spherical surface | Infinity | | | | | |

TABLE 10

| Surface number | A4 | A6 | A8 | A10 | A12 | A14 | A16 | A18 | A20 |
|---|---|---|---|---|---|---|---|---|---|
| S1 | −1.2796E−02 | 1.5343E−02 | −3.0052E−02 | 2.8600E−02 | −1.7401E−02 | 6.9350E−03 | −1.7256E−03 | 2.4178E−04 | −1.4560E−05 |
| S2 | 1.5210E−02 | −1.3055E−02 | −8.3503E−03 | 1.7137E−02 | −1.1988E−02 | 4.6914E−03 | −1.0620E−03 | 1.2910E−04 | −6.5739E−06 |
| S3 | 3.6060E−03 | −4.9931E−02 | 5.0917E−02 | −3.1817E−02 | 1.4163E−02 | −4.6709E−03 | 1.0854E−03 | −1.5480E−04 | 9.9074E−06 |
| S4 | −8.7571E−03 | −4.7594E−02 | 5.7449E−02 | −4.0001E−02 | 1.8999E−02 | −6.1789E−03 | 1.3099E−03 | −1.6306E−04 | 9.0458E−06 |
| S5 | 1.4308E−02 | −2.0776E−02 | 1.1262E−02 | −1.4746E−02 | −1.7522E−03 | 1.3143E−03 | −4.3522E−04 | 7.2954E−05 | −5.0241E−06 |
| S6 | 2.7494E−02 | −2.7992E−02 | 2.1363E−02 | −1.2289E−02 | 5.1382E−03 | −1.4800E−03 | 2.7351E−04 | −2.8492E−05 | 1.2041E−06 |
| S7 | −4.9837E−02 | 2.8911E−02 | −3.1703E−02 | 2.6424E−02 | −1.4325E−02 | 4.9815E−03 | −1.0718E−03 | 1.2963E−04 | −6.7316E−06 |
| S8 | −8.0205E−02 | 6.4461E−02 | −6.3352E−02 | 4.7707E−02 | −2.4485E−02 | 8.2773E−03 | −1.7559E−03 | 2.1116E−04 | −1.0962E−05 |
| S9 | 4.8679E−03 | 2.4573E−02 | −6.4947E−02 | 5.7044E−02 | −2.9904E−02 | 1.0408E−02 | −2.3416E−03 | 3.0782E−04 | −1.7760E−05 |
| S10 | −1.0312E−01 | 7.5251E−02 | −4.9486E−02 | 2.7474E−02 | −1.1632E−02 | 3.4506E−03 | −6.6112E−04 | 7.2793E−05 | −3.4691E−06 |
| S11 | −1.1788E−02 | −1.0248E−03 | −1.8431E−02 | 1.6570E−02 | −7.5203E−03 | 2.0418E−03 | −3.3689E−04 | 3.0990E−05 | −1.2053E−06 |
| S12 | 8.2188E−02 | −9.1653E−02 | 4.1317E−02 | −1.1883E−02 | 2.2688E−03 | −2.8555E−04 | 2.2700E−05 | −1.0275E−06 | 2.0052E−08 |
| S13 | −1.4523E−01 | 5.3643E−02 | −1.6739E−02 | 3.8294E−03 | −5.5049E−04 | 4.5261E−05 | −1.8182E−06 | 1.5764E−08 | 6.6996E−10 |
| S14 | −6.7225E−02 | 2.3795E−02 | −6.6383E−03 | 1.2975E−03 | −1.7375E−04 | 1.5880E−05 | −9.5148E−07 | 3.3375E−08 | −5.1237E−10 |

As shown in FIG. 11, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens and the image side surface S2 of the first lens are convex surfaces. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from the object passes through each of the surfaces S1 to S16 in order and is finally imaged on the imaging plane S17.

In the example, the total effective focal length f of the optical imaging lens is 5.24 mm, the total length TTL of the optical imaging lens is 7.25 mm, the half ImgH of the diagonal length of the effective pixel area on the imaging plane S17 of the optical imaging lens is 4.43 mm, the maximum semi field of view Semi-FOV of the optical imaging lens is 39.52 degree, and the aperture value Fno is 1.43.

Table 11 shows a basic parameter table of the optical imaging lens of embodiment 6, in which the units of the curvature radius, the thickness/distance, and the focal length are millimeters (mm). Table 12 shows the coefficients of the high order terms that can be used for each of the aspheric surface mirror surface in embodiment 6, wherein each aspheric surface type can be defined by the formula (1) given in embodiment 1 as described above.

TABLE 11

| Surface number | Surface type | Curvature Radius | Thickness/distance | Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.0478 | | | | |
| S1 | Aspheric surface | 8.2949 | 0.2841 | 1.55 | 56.11 | 14.95 | 2.0899 |
| S2 | Aspheric surface | −500.0000 | 0.0300 | | | | −99.0000 |
| S3 | Aspheric surface | 4.4968 | 0.3395 | 1.68 | 19.25 | −12.44 | −4.4640 |
| S4 | Aspheric surface | 2.8431 | 0.2267 | | | | −1.9307 |
| S5 | Aspheric surface | 6.8536 | 1.2173 | 1.55 | 56.11 | 4.48 | 0.0000 |
| S6 | Aspheric surface | −3.5595 | 0.0500 | | | | 0.2117 |
| S7 | Aspheric surface | 2.1055 | 0.2662 | 1.68 | 19.25 | −17.23 | −0.6276 |
| S8 | Aspheric surface | 1.6927 | 1.1330 | | | | −0.8368 |
| S9 | Aspheric surface | −7.2282 | 0.6929 | 1.55 | 56.11 | −23.40 | −1.0913 |
| S10 | Aspheric surface | −17.2077 | 0.0620 | | | | 26.5394 |
| S11 | Aspheric surface | 1.9160 | 0.3943 | 1.55 | 56.11 | 7.78 | −3.1911 |
| S12 | Aspheric surface | 3.2370 | 0.8787 | | | | 0.0000 |
| S13 | Aspheric surface | 3.5051 | 0.4607 | 1.55 | 56.11 | −6.90 | 0.0000 |
| S14 | Aspheric surface | 1.7314 | 0.6034 | | | | −4.7498 |
| S15 | Aspheric surface | Infinity | 0.2100 | 1.52 | 64.17 | | |
| S16 | Aspheric surface | Infinity | 0.4035 | | | | |
| S17 | Spherical surface | Infinity | | | | | |

TABLE 12

| Surface number | A 4 | A 6 | A 8 | A 10 | A 12 | A 14 | A 16 | A 18 | A 20 |
|---|---|---|---|---|---|---|---|---|---|
| S1 | −1.2026E−02 | 1.4283E−02 | −3.4998E−02 | 3.8065E−02 | −2.4935E−02 | 1.0387E−02 | −2.6718E−03 | 3.8530E−04 | −2.3758E−05 |
| S2 | 4.3888E−02 | −7.8027E−02 | 7.0693E−02 | −4.1087E−02 | 1.5220E−02 | −3.2374E−03 | 2.6995E−04 | 2.1387E−05 | −4.1432E−06 |
| S3 | 1.7467E−02 | −7.9929E−02 | 8.8688E−02 | −6.0873E−02 | 2.7846E−02 | −8.5065E−03 | 1.6467E−03 | −1.8031E−04 | 8.4577E−06 |
| S4 | −1.9050E−02 | −2.5814E−02 | 3.3273E−02 | −2.4848E−02 | 1.3427E−02 | −4.9883E−03 | 1.1654E−03 | −1.5244E−04 | 8.5109E−06 |
| S5 | 1.2838E−02 | −2.0734E−02 | 1.7869E−02 | −1.2320E−02 | 7.0266E−03 | −2.6702E−03 | 6.0029E−04 | −7.1984E−05 | 3.5154E−06 |
| S6 | 2.4365E−02 | −2.5708E−02 | 2.1973E−02 | −1.4024E−02 | 6.3798E−03 | −1.9471E−03 | 3.7505E−04 | −4.0921E−05 | 1.8960E−06 |
| S7 | −4.7297E−02 | 2.0081E−02 | −1.7283E−02 | 1.2804E−02 | −6.4125E−03 | 2.1054E−03 | −4.3405E−04 | 5.0602E−05 | −2.5305E−06 |
| S8 | −7.3034E−02 | 4.9247E−02 | −4.2021E−02 | 2.8264E−02 | −1.3119E−02 | 4.0526E−03 | −7.9135E−04 | 8.7798E−05 | −4.1903E−06 |
| S9 | 1.0181E−02 | −7.2499E−03 | 5.7956E−03 | −3.8453E−03 | 1.8468E−03 | −5.7432E−04 | 1.0637E−04 | −9.8640E−06 | 3.0108E−07 |
| S10 | −1.3475E−01 | 1.0689E−01 | −7.0503E−02 | 3.7283E−02 | −1.4851E−02 | 4.1822E−03 | −7.7329E−04 | 8.3575E−05 | −3.9671E−06 |
| S11 | −2.5607E−02 | 2.3039E−02 | −3.7889E−02 | 2.6933E−02 | −1.1340E−02 | 2.9747E−03 | −4.8010E−04 | 4.3534E−05 | −1.6834E−06 |
| S12 | 8.6910E−02 | −9.5915E−02 | 4.4762E−02 | −1.3517E−02 | 2.7279E−03 | −3.6278E−04 | 3.0315E−05 | −1.4332E−06 | 2.9053E−08 |
| S13 | −1.4816E−01 | 5.2256E−02 | −1.6773E−02 | 4.4744E−03 | −8.0317E−04 | 8.8320E−05 | −5.6028E−06 | 1.8313E−07 | −2.2626E−09 |
| S14 | −7.5379E−02 | 2.8892E−02 | −9.0492E−03 | 2.0892E−03 | −3.3875E−04 | 3.6696E−05 | −2.4890E−06 | 9.4689E−08 | −1.5340E−09 |

FIG. 12A shows an axial chromatic aberration curve of the optical imaging lens of embodiment 6, which represents a focus deviation of light rays with different wavelengths after passing through the lens. FIG. 12B shows an astigmatism curve of the optical imaging lens of embodiment 6, which represents a meridional image surface curvature and a sagittal image surface curvature. FIG. 12C shows a distortion curve of the optical imaging lens of embodiment 6, which represents distortion magnitude values corresponding to different image heights. FIG. 12D shows a magnification chromatic aberration curve of the optical imaging lens of embodiment 6, which represents the deviation of different image heights on the imaging plane after the light passes through the lens. As can be seen from FIG. 12A to FIG. 12D, the optical imaging lens according to embodiment 6 can achieve good imaging quality.

Embodiment 7

Figure 13:
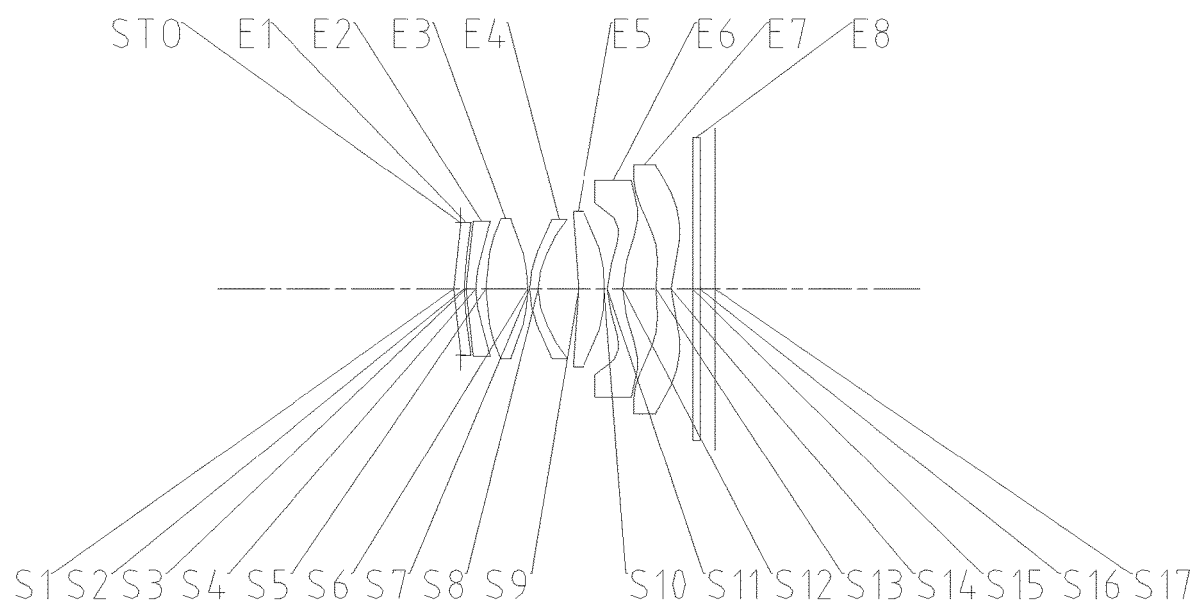
FIG. 13 is a structural schematic diagram of an optical imaging lens according to embodiment 7 of the application.

An optical imaging lens according to embodiment 7 of the application is described below with reference to FIG. 13 to FIG. 14D. FIG. 13 shows a structural schematic diagram of the optical imaging lens according to embodiment 7 of the application.

As shown in FIG. 13, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens is a convex surface and the image side surface S2 of the first lens is a concave surface. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a convex surface. The sixth lens E6 has a positive refractive power, and the object side surface S11 of the sixth lens is a convex surface and the image side surface S12 of the sixth lens is a concave surface. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from the object passes through each of the surfaces S1 to S16 in order and is finally imaged on the imaging plane S17.

In the example, the total effective focal length f of the optical imaging lens is 5.25 mm, the total length TTL of the optical imaging lens is 7.20 mm, the half ImgH of the diagonal length of the effective pixel area on the imaging plane S17 of the optical imaging lens is 4.43 mm, the maximum semi field of view Semi-FOV of the optical imaging lens is 39.45 degree, and the aperture value Fno is 1.44.

Table 13 shows a basic parameter table of the optical imaging lens of embodiment 7, in which the units of the curvature radius, the thickness/distance, and the focal length are millimeters (mm). Table 14 shows the coefficients of the high order terms that can be used for each of the aspheric surface mirror surface in embodiment 7, wherein each aspheric surface type can be defined by the formula (1) given in embodiment 1 as described above.

TABLE 13

| Surface number | Surface type | Curvature Radius | Thickness/ distance | Materials Refractive index | Abbe number | Focal length | Cone coefficient |
|---|---|---|---|---|---|---|---|
| OBJ | Spherical surface | Infinity | Infinity | | | | |
| STO | Spherical surface | Infinity | −0.1793 | | | | |
| S1 | Aspheric surface | 4.6418 | 0.2809 | 1.55 | 56.11 | 27.06 | 0.5511 |
| S2 | Aspheric surface | 6.6241 | 0.0553 | | | | −5.9183 |
| S3 | Aspheric surface | 3.5225 | 0.2700 | 1.68 | 19.25 | −14.01 | −4.6239 |
| S4 | Aspheric surface | 2.4895 | 0.2758 | | | | −1.8775 |
| S5 | Aspheric surface | 4.9568 | 1.1525 | 1.55 | 56.11 | 4.03 | 0.0000 |
| S6 | Aspheric surface | −3.6262 | 0.0500 | | | | 0.0834 |
| S7 | Aspheric surface | 2.1339 | 0.2369 | 1.68 | 19.25 | −15.97 | −0.6154 |
| S8 | Aspheric surface | 1.7025 | 1.1260 | | | | −0.8188 |
| S9 | Aspheric surface | −8.0734 | 0.7001 | 1.55 | 56.11 | −14.77 | 0.8911 |
| S10 | Aspheric surface | 5866.1957 | 0.0914 | | | | 99.0000 |
| S11 | Aspheric surface | 1.7599 | 0.4261 | 1.55 | 56.11 | 6.44 | −3.8621 |
| S12 | Aspheric surface | 3.2224 | 0.9210 | | | | 0.0000 |
| S13 | Aspheric surface | 3.4479 | 0.4155 | 1.55 | 56.11 | −6.55 | 0.0000 |
| S14 | Aspheric surface | 1.6810 | 0.5884 | | | | −4.8857 |
| S15 | Aspheric surface | Infinity | 0.2100 | 1.52 | 64.17 | | |
| S16 | Aspheric surface | Infinity | 0.4036 | | | | |
| S17 | Spherical surface | Infinity | | | | | |

TABLE 14

| Surface number | A4 | A6 | A8 | A10 | A12 | A14 | A16 | A18 | A20 |
|---|---|---|---|---|---|---|---|---|---|
| S1 | −3.5094E−03 | −5.5276E−05 | −1.3714E−02 | 1.6667E−02 | −1.2084E−02 | 5.5439E−03 | −1.5367E−03 | 2.3367E−04 | −1.4970E−05 |
| S2 | 2.6078E−02 | −3.0689E−02 | 2.0129E−02 | −9.9587E−03 | 1.9196E−03 | 9.6095E−04 | −6.6569E−04 | 1.4866E−04 | −1.1904E−05 |

TABLE 14-continued

| Surface number | A 4 | A 6 | A 8 | A 10 | A 12 | A 14 | A 16 | A 18 | A 20 |
|---|---|---|---|---|---|---|---|---|---|
| S3 | −9.3309E−03 | −2.5844E−02 | 3.4885E−02 | −2.6703E−02 | 1.2560E−02 | −3.5157E−03 | 5.0967E−04 | −2.2849E−05 | −1.2725E−06 |
| S4 | −2.9773E−02 | −9.2164E−03 | 2.5002E−02 | −2.3319E−02 | 1.3524E−02 | −5.1004E−03 | 1.1896E−03 | −1.5450E−04 | 8.5421E−06 |
| S5 | 5.5594E−03 | −9.3983E−03 | 7.9452E−03 | −4.5025E−03 | 2.0065E−03 | −6.3386E−04 | 1.2367E−04 | −1.2908E−05 | 5.2809E−07 |
| S6 | 2.4883E−02 | −2.5015E−02 | 1.8579E−02 | −9.8847E−03 | 3.6547E−03 | −8.8055E−04 | 1.2940E−04 | −1.0161E−05 | 2.8980E−07 |
| S7 | −5.0755E−02 | 2.9508E−02 | −2.8485E−02 | 2.1427E−02 | −1.0770E−02 | 3.5247E−03 | −7.2022E−04 | 8.2996E−05 | −4.1026E−06 |
| S8 | −7.8458E−02 | 6.1239E−02 | −5.5758E−02 | 3.9030E−02 | −1.8796E−02 | 6.0122E−03 | −1.2137E−03 | 1.3919E−04 | −6.8833E−06 |
| S9 | 7.5086E−03 | −7.3233E−03 | 7.3985E−03 | −5.2343E−03 | 2.4848E−03 | −7.4627E−04 | 1.3365E−04 | −1.2202E−05 | 3.8256E−07 |
| S10 | −1.6889E−01 | 1.3933E−01 | −9.4261E−02 | 4.9677E−02 | −1.9323E−02 | 5.2607E−03 | −9.3758E−04 | 9.7724E−05 | −4.4858E−06 |
| S11 | −3.8434E−02 | 4.0706E−02 | −5.2042E−02 | 3.5018E−02 | −1.4508E−02 | 3.7945E−03 | −6.1275E−04 | 5.5607E−05 | −2.1530E−06 |
| S12 | 7.5411E−02 | −8.9254E−02 | 4.3005E−02 | −1.3367E−02 | 2.7753E−03 | −3.8049E−04 | 3.2872E−05 | −1.6104E−06 | 3.3882E−08 |
| S13 | −1.6499E−01 | 6.3801E−02 | −2.1436E−02 | 5.6631E−03 | −1.0022E−03 | 1.0996E−04 | −7.0315E−06 | 2.3309E−07 | −2.9276E−09 |
| S14 | −8.2753E−02 | 3.4393E−02 | −1.1115E−02 | 2.5794E−03 | −4.1371E−04 | 4.4027E−05 | −2.9310E−06 | 1.0969E−07 | −1.7540E−09 |

Figures 14A, 14B:
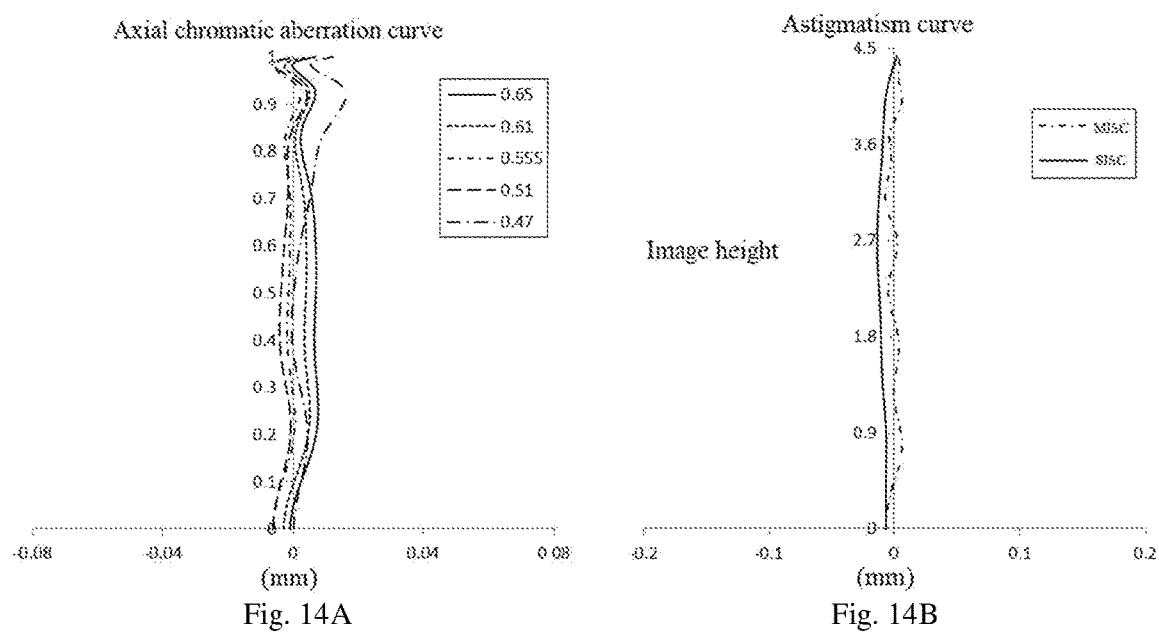
FIG. 14A to FIG. 14D show an axial chromatic aberration curve, an astigmatism curve, a distortion curve and a magnification chromatic aberration curve of an optical imaging lens of embodiment 7, respectively.
Figure 14C:
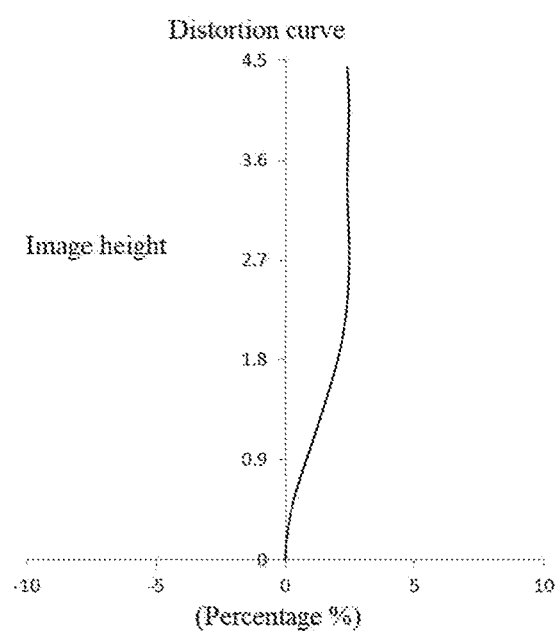
Figure 14D:
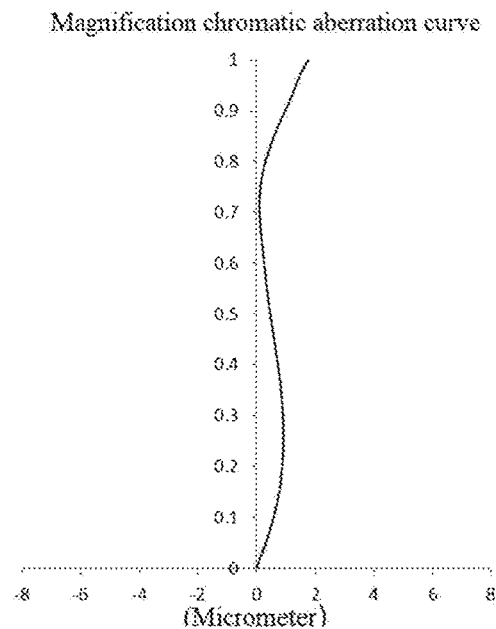

FIG. 14A shows an axial chromatic aberration curve of the optical imaging lens of embodiment 7, which represents a focus deviation of light rays with different wavelengths after passing through the lens. FIG. 14B shows an astigmatism curve of the optical imaging lens of embodiment 7, which represents a meridional image surface curvature and a sagittal image surface curvature. FIG. 14C shows a distortion curve of the optical imaging lens of embodiment 7, which represents distortion magnitude values corresponding to different image heights. FIG. 14D shows a magnification chromatic aberration curve of the optical imaging lens of embodiment 7, which represents the deviation of different image heights on the imaging plane after the light passes through the lens. As can be seen from FIG. 14A to FIG. 14D, the optical imaging lens according to embodiment 7 can achieve good imaging quality.

Embodiment 8

Figure 15:
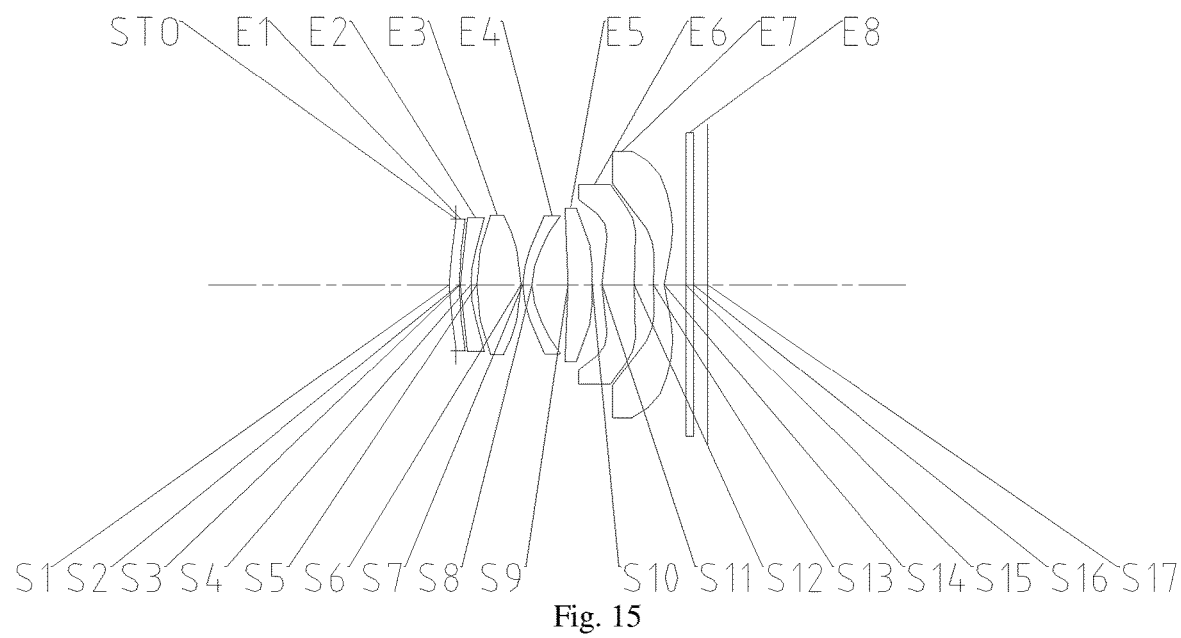
FIG. 15 is a structural schematic diagram of an optical imaging lens according to embodiment 8 of the application.

An optical imaging lens according to embodiment 8 of the application is described below with reference to FIG. 15 to FIG. 16D. FIG. 15 shows a structural schematic diagram of the optical imaging lens according to embodiment 8 of the application.

As shown in FIG. 15, the optical imaging lens sequentially comprises the following components from an object side to an image side: a diaphragm STO, a first lens E1, a second lens E2, a third lens E3, a fourth lens E4, a fifth lens E5, a sixth lens E6, a seventh lens E7, a filter E8, and an imaging plane S17.

The first lens E1 has a positive refractive power, and the object side surface S1 of the first lens is a convex surface and the image side surface S2 of the first lens is a concave surface. The second lens E2 has a negative refractive power, and the object side surface S3 of the second lens is convex surface and the image side surface S4 of the second lens is concave surface. The third lens E3 has a positive refractive power, and the object side surface S5 of the third lens and the image side surface S6 of the third lens are convex surfaces. The fourth lens E4 has a negative refractive power, and the object side surface S7 of the fourth lens is a convex surface and the image side surface S8 of the fourth lens is a concave surface. The fifth lens E5 has a negative refractive power, and the object side surface S9 of the fifth lens is a concave surface and the image side surface S10 of the fifth lens is a concave surface. The sixth lens E6 has a positive refractive power, and the object-side surface S11 of the sixth lens and the image-side surface S12 of the sixth lens are convex surfaces. The seventh lens E7 has a negative refractive power, and the object side surface S13 of the seventh lens is a convex surface and the image side surface S14 of the seventh lens is a concave surface. The filter E8 has an object side surface S15 and an image side surface S16. Light from the object passes through each of the surfaces S1 to S16 in order and is finally imaged on the imaging plane S17.

In the example, the total effective focal length f of the optical imaging lens is 5.24 mm, the total length TTL of the optical imaging lens is 7.23 mm, the half ImgH of the diagonal length of the effective pixel area on the imaging plane S17 of the optical imaging lens is 4.44 mm, the maximum semi field of view Semi-FOV of the optical imaging lens is 39.45 degree, and the aperture value Fno is 1.43.

Table 15 shows a basic parameter table of the optical imaging lens of embodiment 8, in which the units of the curvature radius, the thickness/distance, and the focal length are millimeters (mm). Table 16 shows the coefficients of the high order terms that can be used for each of the aspheric surface mirror surface in embodiment 8, wherein each aspheric surface type can be defined by the formula (1) given in embodiment 1 as described above.

TABLE 15

| Surface number | Surface type | Curvature Radius | Thickness/ distance | Materials | | Focal length | Cone coefficient |
|---|---|---|---|---|---|---|---|
| | | | | Refractive index | Abbe number | | |
| OBJ | Spherical surface | Infinity | Infinity | | | | |
| STO | Spherical surface | Infinity | −0.1846 | | | | |
| S1 | Aspheric surface | 4.9911 | 0.2800 | 1.55 | 56.11 | 24.44 | 1.1750 |
| S2 | Aspheric surface | 7.8165 | 0.0300 | | | | −9.4089 |
| S3 | Aspheric surface | 3.6288 | 0.2912 | 1.68 | 19.25 | −15.43 | −4.6379 |
| S4 | Aspheric surface | 2.6065 | 0.1723 | | | | −1.8783 |
| S5 | Aspheric surface | 4.9743 | 1.2294 | 1.55 | 56.11 | 4.13 | 0.0000 |
| S6 | Aspheric surface | −3.7725 | 0.0500 | | | | 0.2942 |

TABLE 15-continued

| Surface number | Surface type | Curvature Radius | Thickness/ distance | Materials Refractive index | Abbe number | Focal length | Cone coefficient |
|---|---|---|---|---|---|---|---|
| S7 | Aspheric surface | 2.1522 | 0.2578 | 1.68 | 19.25 | −15.14 | −0.6216 |
| S8 | Aspheric surface | 1.6928 | 1.0013 | | | | −0.8238 |
| S9 | Aspheric surface | −14.6363 | 0.7003 | 1.55 | 56.11 | −26.77 | 19.4089 |
| S10 | Aspheric surface | 11022.6507 | 0.2674 | | | | −99.0000 |
| S11 | Aspheric surface | 3.2917 | 0.8962 | 1.55 | 56.11 | 5.99 | −3.3997 |
| S12 | Aspheric surface | −500.0000 | 0.5326 | | | | 0.0000 |
| S13 | Aspheric surface | 3.8912 | 0.3084 | 1.55 | 56.11 | −4.90 | 0.0000 |
| S14 | Aspheric surface | 1.5401 | 0.6004 | | | | −4.2054 |
| S15 | Aspheric surface | Infinity | 0.2100 | 1.52 | 64.17 | | |
| S16 | Aspheric surface | Infinity | 0.4036 | | | | |
| S17 | Spherical surface | Infinity | | | | | |

TABLE 16

| Surface number | A 4 | A 6 | A 8 | A 10 | A 12 | A 14 | A 16 | A 18 | A 20 |
|---|---|---|---|---|---|---|---|---|---|
| S1 | −1.2739E−02 | 1.7392E−02 | −3.4411E−02 | 3.3756E−02 | −2.1128E−02 | 8.5640E−03 | −2.1400E−03 | 2.9736E−04 | −1.7559E−05 |
| S2 | 5.2580E−03 | 2.3540E−02 | −6.5143E−02 | 7.0726E−02 | −4.5636E−02 | 1.8669E−02 | −4.6914E−03 | 6.5523E−04 | −3.8785E−05 |
| S3 | −8.0476E−03 | −1.1452E−02 | 5.6748E−04 | 7.8481E−03 | −7.5270E−03 | 3.7039E−03 | −1.0556E−03 | 1.6244E−04 | −1.0332E−05 |
| S4 | −1.4663E−02 | −3.5786E−02 | 5.1567E−02 | −4.4272E−02 | 2.5884E−02 | −9.9259E−03 | 2.3423E−03 | −3.0658E−04 | 1.7021E−05 |
| S5 | 1.0622E−02 | −2.0852E−02 | 1.7001E−02 | −9.7595E−03 | 4.6637E−03 | −1.5670E−03 | 3.0619E−04 | −2.8593E−05 | 7.4325E−07 |
| S6 | 2.3474E−02 | −2.0521E−02 | 1.3256E−02 | −6.4950E−03 | 2.3736E−03 | −5.9238E−04 | 8.9990E−05 | −6.6747E−06 | 8.4829E−08 |
| S7 | −5.3537E−02 | 3.8341E−02 | −4.0273E−02 | 3.1115E−02 | −1.6075E−02 | 5.4351E−03 | −1.1516E−03 | 1.3819E−04 | −7.1445E−06 |
| S8 | −8.1806E−02 | 6.8242E−02 | −6.4179E−02 | 4.5842E−02 | −2.2641E−02 | 7.4597E−03 | −1.5551E−03 | 1.8457E−04 | −9.4591E−06 |
| S9 | −1.0478E−02 | 3.5138E−03 | 4.4416E−03 | −5.8815E−03 | 3.6341E−03 | −1.2950E−03 | 2.6904E−04 | −2.9577E−05 | 1.2910E−06 |
| S10 | −6.2657E−02 | 6.1616E−04 | 1.2178E−02 | −5.1373E−03 | −9.1951E−05 | 7.8562E−04 | −2.8578E−04 | 4.4834E−05 | −2.7052E−06 |
| S11 | −1.2581E−02 | −2.6425E−02 | 1.0909E−02 | 3.3814E−04 | −2.7115E−03 | 1.3761E−03 | −3.3884E−04 | 4.1921E−05 | −2.0526E−06 |
| S12 | 7.0059E−02 | −5.5885E−02 | 2.1224E−02 | −5.6813E−03 | 1.0131E−03 | −1.1210E−04 | 7.2895E−06 | −2.5271E−07 | 3.5438E−09 |
| S13 | −1.5387E−01 | 4.3753E−02 | −6.8224E−03 | −1.3571E−03 | 9.6787E−04 | −2.0866E−04 | 2.2397E−05 | −1.2129E−06 | 2.6437E−08 |
| S14 | −1.0065E−01 | 4.2437E−02 | −1.3396E−02 | 2.9329E−03 | −4.2111E−04 | 3.8602E−05 | −2.1740E−06 | 6.8425E−08 | −9.1953E−10 |

Figure 16A:
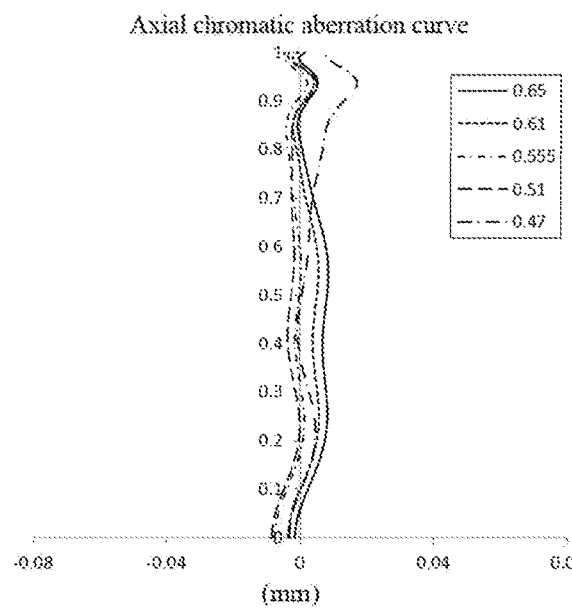
FIG. 16A to FIG. 16D show an axial chromatic aberration curve, an astigmatism curve, a distortion curve and a magnification chromatic aberration curve of an optical imaging lens of embodiment 8, respectively.
Figure 16B:
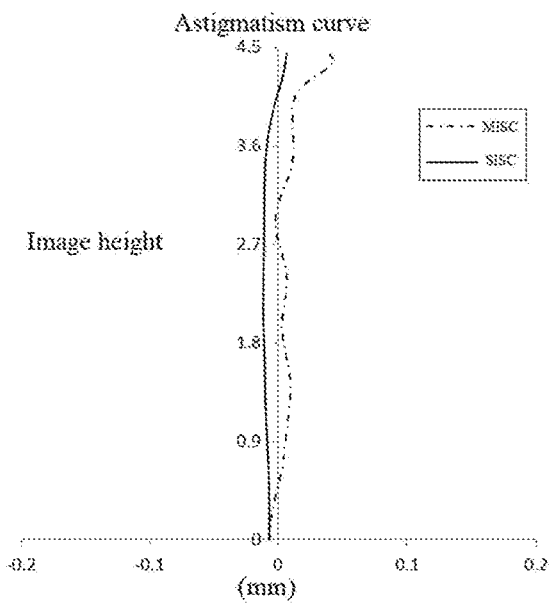
Figure 16C:
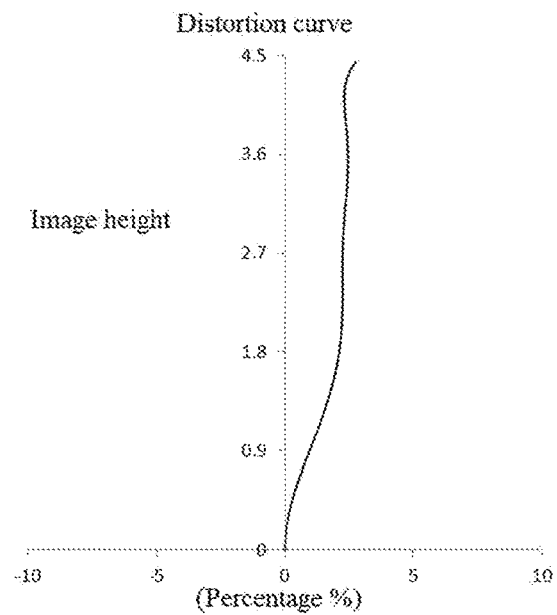
Figure 16D:
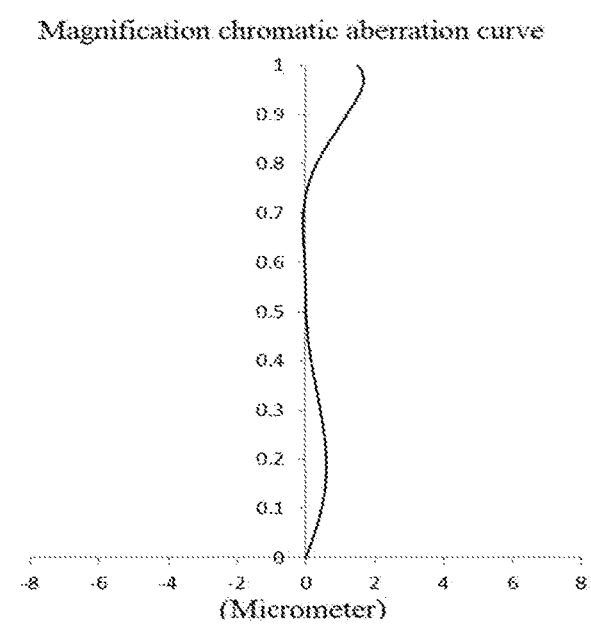

FIG. 16A shows an axial chromatic aberration curve of the optical imaging lens of embodiment 8, which represents a focus deviation of light rays with different wavelengths after passing through the lens. FIG. 16B shows an astigmatism curve of the optical imaging lens of embodiment 8, which represents a meridional image surface curvature and a sagittal image surface curvature. FIG. 16C shows a distortion curve of the optical imaging lens of embodiment 8, which represents distortion magnitude values corresponding to different image heights. FIG. 16D shows a magnification chromatic aberration curve of the optical imaging lens of embodiment 8, which represents the deviation of different image heights on the imaging plane after the light passes through the lens. As can be seen from FIG. 16A to FIG. 16D, the optical imaging lens according to embodiment 8 can achieve good imaging quality.

In summary, embodiments 1 to 8 satisfy the relationship shown in table 17.

TABLE 17

| Conditional expression/ embodiment | 1 | 2 | 3 | 4 | 5 | 6 | 7 | 8 |
|---|---|---|---|---|---|---|---|---|
| tan(Semi-FOV) × f | 4.52 | 4.29 | 4.40 | 4.37 | 4.35 | 4.33 | 4.32 | 4.31 |
| SAG41/ SAG42 | 0.74 | 0.78 | 0.70 | 0.89 | 0.78 | 0.79 | 0.78 | 0.76 |
| f3/(R5 − R6) | 0.46 | 0.48 | 0.47 | 0.47 | 0.46 | 0.43 | 0.47 | 0.47 |
| f/f6 | 0.66 | 0.69 | 0.71 | 0.65 | 0.52 | 0.67 | 0.82 | 0.87 |
| (R7 − R8)/ (R7 + R8) | 0.13 | 0.12 | 0.17 | 0.02 | 0.12 | 0.11 | 0.11 | 0.12 |

TABLE 17-continued

| Conditional expression/ embodiment | 1 | 2 | 3 | 4 | 5 | 6 | 7 | 8 |
|---|---|---|---|---|---|---|---|---|
| DT11/DT31 | 0.96 | 0.95 | 0.95 | 0.94 | 0.96 | 0.96 | 0.95 | 0.96 |
| T67/T45 | 0.62 | 0.61 | 0.63 | 0.85 | 0.64 | 0.78 | 0.82 | 0.53 |
| (CT3 + CT5 + CT6)/TTL | 0.33 | 0.35 | 0.38 | 0.31 | 0.33 | 0.32 | 0.32 | 0.39 |
| |R14/R13| | 0.48 | 0.48 | 0.47 | 0.48 | 0.48 | 0.49 | 0.49 | 0.40 |
| (T12 + T23 + T34)/CT3 | 0.26 | 0.15 | 0.20 | 0.21 | 0.24 | 0.25 | 0.33 | 0.21 |
| f123/f | 0.92 | 0.92 | 0.83 | 1.18 | 0.93 | 0.94 | 0.92 | 0.91 |

The application also provides an imaging device, wherein the electronic photosensitive element can be a photosensitive coupling element (CCD) or a complementary metal oxide semiconductor (CMOS). The imaging device may be a stand-alone imaging device such as a digital camera, or an imaging module integrated on a mobile electronic device such as a mobile phone. The imaging device is equipped with the optical imaging lens described above.

The above description is only a preferred embodiment of the application and is illustrative of the principles of the technology employed. It should be understood by those skilled in the art that the scope of the application described in the application is not limited to the specific combination of the above-described technical features, and other technical features formed by any combination of the above-described technical features or the equivalent technical features may be included without departing from the scope of the present application. For example, the above-described features and (but not limited to) the technical features having similar functions disclosed in the application may be replaced with one another.

The invention claimed is:

1. An optical imaging lens is characterized by sequentially comprising the following components from an object side to an image side along an optical axis:
   a first lens having a refractive power;
   a second lens having a refractive power;
   a third lens having a refractive power, an object side surface of which is a convex surface, and an image side surface of which is a convex surface;
   a fourth lens having a refractive power, an object side surface of which is a convex surface, and an image side surface of which is a concave surface;
   a fifth lens having a refractive power;
   a sixth lens having a positive refractive power;
   a seventh lens having a refractive power, an object side surface of which is a convex surface;
   wherein, a total effective focal length f of the optical imaging lens and an entrance pupil diameter EPD of the optical imaging lens satisfy the following relation: f/EPD<1.7; and
   the total effective focal length f of the optical imaging lens and a maximum semi field of view Semi-FOV of the optical imaging lens meet the following relation: 4 mm<tan(Semi-FOV)×f<5 mm,
   wherein a spacing distance T12 between the first lens and the second lens on the optical axis, a spacing distance T23 between the second lens and the third lens on the optical axis, a spacing distance T34 between the third lens and the fourth lens on the optical axis and a center thickness CT3 of the third lens on the optical axis satisfy the following relation: 0<(T12+T23+T34)/CT3≤0.33.

2. The optical imaging lens as claimed in claim 1, wherein a combined focal length f123 of the first lens, the second lens and the third lens and the total effective focal length f of the optical imaging lens satisfy following relation: 0.6<f123/f≤1.18.

3. The optical imaging lens as claimed in claim 1, wherein the total effective focal length f of the optical imaging lens and an effective focal length f6 of the sixth lens satisfy the following relation: 0.52≤f/f6<1.1.

4. The optical imaging lens as claimed in claim 1, wherein a spacing distance T45 between the fourth lens and the fifth lens on the optical axis and a spacing distance T67 between the sixth lens and the seventh lens on the optical axis satisfy the following relation: 0.3<T67/T45<1.

5. The optical imaging lens as claimed in claim 1, wherein the center thickness CT3 of the third lens on the optical axis, a center thickness CT5 of the fifth lens on the optical axis, a center thickness CT6 of the sixth lens on the optical axis and a distance TTL from the object side surface of the first lens to an imaging plane of the optical imaging lens on the optical axis satisfy the following relation: 0.1<(CT3+5CT5+CT6)/TTL<0.6.

6. The optical imaging lens as claimed in claim 1, wherein a curvature radius R5 of the object side surface of the third lens, a curvature radius R6 of the image side surface of the third lens and an effective focal length f3 of the third lens satisfy the following relation: 0<f3/(R5−R6)≤0.48.

7. The optical imaging lens as claimed in claim 1, wherein a curvature radius R7 of the object side surface of the fourth lens and a curvature radius R8 of the image side surface of the fourth lens satisfy the following relation: 0<(R7−R8)/(R7+R8)<0.3.

8. The optical imaging lens as claimed in claim 1, wherein a curvature radius R13 of the object side surface of the seventh lens and a curvature radius R14 of the image side surface of the seventh lens satisfy the following relation: 0.2<|R14/R13|<0.6.

9. An optical imaging lens is characterized by sequentially comprising the following components from an object side to an image side along an optical axis:
   a first lens having a refractive power, an object side surface of which is a convex surface;
   a second lens having a refractive power;
   a third lens having a refractive power, an object side surface of which is a convex surface, and an image side surface of which is a convex surface;
   a fourth lens having a refractive power, an object side surface of which is a convex surface, and an image side surface of which is a concave surface;
   a fifth lens having a refractive power;
   a sixth lens having a refractive power;
   a seventh lens having a refractive power;
   a total effective focal length f of the optical imaging lens and an entrance pupil diameter EPD of the optical imaging lens satisfy the following relation: f/EPD<2; and
   a distance SAG41 on the optical axis from an intersection of the object side surface of the fourth lens and the optical axis to an effective radius vertex of the object side surface of the fourth lens and a distance SAG42 on the optical axis from an intersection of the image side surface of the fourth lens and the optical axis to an effective radius vertex of the image side surface of the fourth lens satisfy the following relation: 0.5<SAG41/SAG42<1,
   wherein a spacing distance T12 between the first lens and the second lens on the optical axis, a spacing distance T23 between the second lens and the third lens on the optical axis, a spacing distance T34 between the third lens and the fourth lens on the optical axis and a center thickness CT3 of the third lens on the optical axis satisfy the following relation: 0<(T12+T23+T34)/CT3≤0.33.

* * * * *